(12) United States Patent
Nakajima et al.

(10) Patent No.: US 7,332,680 B2
(45) Date of Patent: Feb. 19, 2008

(54) CONVEYING DEVICE HAVING CONTAINER ORDER CHANGING MECHANISM, AND COMBINATION WEIGHING DEVICE AND QUALITY INSPECTION DEVICE PROVIDED THEREWITH

(75) Inventors: Masayoshi Nakajima, Ritto (JP); Fumitaka Tokuda, Kusatsu (JP)

(73) Assignee: Ishida Co., Ltd., Kyoto (JP)

(*) Notice: Subject to any disclaimer, the term of this patent is extended or adjusted under 35 U.S.C. 154(b) by 0 days.

(21) Appl. No.: 11/419,990

(22) Filed: May 23, 2006

(65) Prior Publication Data
US 2006/0266560 A1 Nov. 30, 2006

(30) Foreign Application Priority Data
May 26, 2005 (JP) .............................. 2005-153344
Sep. 26, 2005 (JP) .............................. 2005-278532

(51) Int. Cl.
*G01G 19/00* (2006.01)
(52) U.S. Cl. .............................. 177/25.18; 198/377.07; 209/523; 209/617; 177/145
(58) Field of Classification Search .............................
198/377.01–377.03, 377.07, 459.2; 177/25.18, 177/103, 104, 119, 145; 209/522, 523, 617
See application file for complete search history.

(56) References Cited

U.S. PATENT DOCUMENTS

| | | | | |
|---|---|---|---|---|
| 4,442,932 A | | 4/1984 | Sashiki et al. | |
| 4,466,765 A | * | 8/1984 | Mautino | 414/277 |
| 5,505,311 A | * | 4/1996 | Kronseder et al. | 209/522 |
| 5,889,235 A | * | 3/1999 | Kawanishi et al. | 177/25.18 |
| 7,015,399 B2 | * | 3/2006 | Murata et al. | 177/25.18 |

FOREIGN PATENT DOCUMENTS

| | | |
|---|---|---|
| EP | 0 806 638 A1 | 11/1997 |
| JP | 8/29242 A | 2/1996 |
| JP | 9/229755 A | 9/1997 |
| JP | 10-325752 A | 12/1998 |
| JP | 2003/270031 A | 9/2003 |
| WO | 2005/036106 A1 | 9/2004 |

* cited by examiner

Primary Examiner—Randy W Gibson
(74) Attorney, Agent, or Firm—Global IP Counselors, LLP

(57) ABSTRACT

A conveying device is disclosed that changes the order of containers during conveyance in order to speed up processes, such as a discharging process performed by a combination weighing device and a rank-order sorting process performed by a quality inspection device. With a combination weighing device, a plurality of containers placed on a rotary table are moved by rotatably driving the rotary table. While the containers are being moved, a container arrangement mechanism changes the sequential order of the containers that are specified by a control unit.

19 Claims, 23 Drawing Sheets

(a)

(b)

(a)

(b)

(c)

(a)

(b)

(a)

(b)

(a)

(b)

CONVEYING DEVICE HAVING CONTAINER ORDER CHANGING MECHANISM, AND COMBINATION WEIGHING DEVICE AND QUALITY INSPECTION DEVICE PROVIDED THEREWITH

CROSS-REFERENCE TO RELATED APPLICATIONS

This application claims priority to Japanese Patent Application Nos. 2005-153344 and 2005-278532. The entire disclosure of Japanese Patent Application Nos. 2005-153344 and 2005-278532 is hereby incorporated herein by reference.

BACKGROUND OF THE INVENTION

1. Field of the Invention

The present invention relates to a conveying device mounted in a device such as a quality inspection device and a combination weighing device, which respectively inspects and weighs articles dropped into a container.

2. Background Information

Conventionally, a device such as a combination weighing device equipped with a conveying device has been used to drop articles into a plurality of containers and convey these containers.

For example, Japanese Patent Application Publication No. H09-229755 (published on Sep. 5, 1997) discloses an automatic combination weighing device that discharges articles from desired containers while cyclically moving a plurality of containers in a Z direction. Here, while circulating the plurality of containers, the device inverts containers that are moved to a predetermined discharge position in order to discharge the articles from the containers. See also Japanese Patent Application Publication No. H08-29242 (published on Feb. 2, 1996) and Japanese Patent Application Publication. 2003-270031 (published on Sep. 25, 2003).

However, the above conventional devices have the following problem.

Specifically, with the automatic combination weighing devices disclosed in the above documents, it is not possible to change the order of the containers in which articles have been dropped. Accordingly, it is necessary to wait until containers selected by combination weighing are moved to a predetermined discharge position. Consequently, it is difficult to speed up the process in which articles are discharged from all the selected containers.

In view of the above, it will be apparent to those skilled in the art from this disclosure that there exists a need for an improved conveying device capable of speeding up the discharge process in a combination weighing device and a rank-order sorting process in a quality inspection device, by changing the order of containers while they are being conveyed. This invention addresses this need in the art as well as other needs, which will become apparent to those skilled in the art from this disclosure.

SUMMARY OF THE INVENTION

A conveying device according to a first aspect of the present invention comprises a conveying unit, an order changing mechanism, and a control unit. The conveying unit conveys a plurality of containers. The order changing mechanism changes the order of a plurality of containers selected from amongst the plurality of containers being conveyed by the conveying unit. The control unit specifies which containers are to be arranged in the order by the order changing mechanism.

Here, the conveying device is provided with a conveying unit that simultaneously conveys a plurality of containers. The conveying device is also provided with a order changing mechanism that changes the order of a plurality of containers (for example, two containers) that are specified by the control unit. Here, the control unit specifies which containers are to be arranged in the order, based on the results of weighing by a combination weighing unit and the results of inspection by a quality inspection unit, which are disposed upstream thereof. Then, the order changing mechanism changes the order of the containers specified by the control unit while the containers are being conveyed.

Accordingly, for example, when the conveying device of the present invention is mounted in a combination weighing device, the order of a plurality of containers with weighed articles dropped therein can be changed during conveyance, and the containers can be arranged in the order in which the weighed articles are discharged by combination weighing. As a result, a process in which the weighed articles are discharged from the selected containers can be continuously performed, so that the process can be speeded up.

On the other hand, when the conveying device of the present invention is mounted in a quality inspection device, it is possible to change the order of the containers such that a plurality of articles that are ranked as a result of quality inspection are grouped under the same rank. As a result, the articles that are ranked by the quality inspection device can be sorted according to their rank during conveyance, so that the process of rank-order sorting can be speeded up.

Further, when the conveying device of the present invention is mounted in a quality control apparatus which simply determines the conformity of products, it is possible to change the order of the containers such that non-defective products are gathered into groups each having a predetermined number. As a result, for example, when boxing 24 non-defective products per box in bulk, non-defective products gathered into groups each having 24 such products while they are being conveyed can be boxed as is. In addition, when defective products are gathered into groups having a predetermined number, they can be collected all at once. Consequently, post-processes such as boxing non-defective products and collecting defective products can be efficiently performed.

A conveying device according to a second aspect of the present invention is the conveying device according to the first aspect of the present invention, wherein the order changing mechanism changes the order of two selected adjacent containers.

Here, the order changing mechanism changes the order of two mutually adjacent containers that are specified by the control unit.

Accordingly, it is possible to change the order of the containers being conveyed with the simplest control. As a result, when the conveying device is mounted in a combination weighing device, arranging the containers in the order in which articles dropped into the containers are discharged will result in speeding up of the discharging process. In addition, when the conveying device is mounted in a quality inspection device, changing the order of the containers according to the quality of articles dropped into the containers enables easy sorting of the articles by rank.

A conveying device according to a third aspect of the present invention is the conveying device according to the first or the second aspect of the present invention, wherein the order changing mechanism comprises a pair of holding portions that hold containers to be arranged in the order; a rotary shaft that is disposed midway of the holding portions; and a drive unit configured to rotate the pair of holding portions around the rotary shaft.

Here, the holding portions that hold a plurality of containers to be arranged in the order are rotated approximately 180 degrees by the drive unit around the rotary shaft disposed midway between the holding portions.

Consequently, for example, when changing the order of two containers, the holding portions holding the two containers are rotated 180 degrees together with the containers around the rotary shaft disposed midway between the holding portions, and thus it is possible to easily change the order of the containers specified by the control unit.

A conveying device according to a fourth aspect of the present invention is the conveying device according to any one of the first through the third aspects, wherein the order changing mechanism is disposed along a conveying path along which the containers are conveyed by the conveying unit.

Here, the order changing mechanism that changes the order of the containers is disposed along the conveying path along which the containers are conveyed.

Accordingly, when containers specified by the control unit among the plurality of containers that are being conveyed, are conveyed to the position of the order changing mechanism, the order of these containers can be easily changed.

A conveying device according to a fifth aspect of the present invention is the conveying device according to any one of the first through the fourth aspects of the present invention, wherein the order changing mechanism changes the order of the containers by rotatably moving the containers in a substantially horizontal plane.

Here, the containers to be arranged in the order are rotatably moved in the horizontal plane, and are arranged in the desired order.

Accordingly, even when changing the order of the containers while they are being conveyed, the articles dropped into the containers can be prevented from spilling from the containers.

A conveying device according to a sixth aspect of the present invention is the conveying device according to any one of the first through the fifth aspects of the present invention, wherein the order changing mechanism is one of a plurality of order changing mechanisms that are disposed along the conveying path along which the containers are conveyed by the conveying unit.

Here, the conveying device is provided with the plurality of order changing mechanisms that are disposed along the conveying path of the containers.

Accordingly, a plurality of containers can be simultaneously arranged in the order, so that it is possible to more efficiently change the order of the containers in the desired order.

A combination weighing device according to a seventh aspect of the present invention comprises the conveying device according to any one of the first through the sixth aspects of the present invention, a weighing unit that weighs articles that are dropped into the containers, and a discharge unit that discharges the articles from a plurality of containers that are arranged in a desired order by the conveying device.

Here, the conveying device of the present invention is mounted in a combination weighing device.

Accordingly, the order of a plurality of containers selected by the combination weighing device can be changed such that they are continuously arranged before they are conveyed to the discharge position. As a result, with the discharge unit, the articles can be continuously discharged from the selected containers that are continuously disposed, and consequently, it will be possible to provide a combination weighing device capable of speeding up the process.

A quality inspection device according to an eighth aspect of the present invention comprises the conveying device according to any one of the first through the sixth aspects of the present invention, and an inspection unit that performs quality inspection of articles dropped into the containers.

Here, the conveying device of the present invention is mounted in a quality inspection device such as a rank-order sorting apparatus and a seal checker.

Accordingly, the containers containing articles that are inspected by the quality inspection device can be arranged during conveyance, for example, in a rank order, when the conveying device is mounted in a rank-order sorting apparatus. As a result, it will be possible to provide a quality inspection device, which is capable of speeding up the processes to be performed after the quality inspection is implemented by arranging the containers in the desired order during conveyance.

A conveying device according to a ninth aspect of the present invention is the conveying device according to any one of the first through the sixth aspects of the present invention, wherein the order changing mechanism changes, in a substantially perpendicular plane, the order of a plurality of containers selected from amongst the plurality of containers that are being conveyed by the conveying unit.

Here, the conveying device comprises the conveying unit that simultaneously conveys the plurality of containers. The conveying device also comprises the order changing mechanism that changes, in a substantially perpendicular plane, the order of a plurality of containers (for example, two containers) that are specified by the control unit.

Here, the control unit specifies which containers are to be arranged in the order, based on the results of weighing by the combination weighing unit and the results of the inspection by the quality inspection unit. Then, the order changing mechanism changes, in a substantially perpendicular plane, the order of containers specified by the control unit, while the containers are being conveyed.

Accordingly, for example, when the conveying device of the present invention is mounted in a combination weighing device, the order of a plurality of containers with weighed articles dropped therein can be changed during conveyance, and the containers can be arranged in the order in which the articles are discharged by combination weighing. As a result, the process in which the weighed articles are discharged from the selected containers can be continuously performed, so that the process can be speeded up.

On the other hand, when the conveying device of the present invention is mounted in a quality inspection device, a plurality of containers with articles that are ranked as the result of the quality inspection can be arranged in an order such that the articles having the same rank are grouped together. As a result, the articles that are ranked by the quality inspection device can be sorted according to their rank during conveyance, and thus the process of rank-order sorting can be speeded up.

In addition, by changing the order of the containers as discussed above in the perpendicular plane, the horizontal space that is occupied by the device can be reduced, resulting in space savings.

A conveying device according to a tenth aspect of the present invention is the conveying device according to the ninth aspect of the present invention, wherein the order changing mechanism includes a rotating mechanism that rotates the orientation of the containers.

Here, when the order of the plurality of containers being conveyed is changed in the perpendicular plane or when the plurality of containers are conveyed in the horizontal plane, the rotating mechanism vertically inverts the orientation of the containers. Here, the containers that are conveyed by the conveying device of the present invention include, for example, a cup-shaped container that is formed by a base plate, side walls, and an upper opening.

Accordingly, when moving the containers and changing their order in the perpendicular plane and the like, the articles stored in the containers can be discharged from the containers by rotating the containers. As a result, it will be possible to provide a conveying device which has a function which discharges articles from the containers, in addition to a function in which the order of the containers is changed.

A conveying device according to an eleventh aspect of the present invention is the conveying device according to the ninth or the tenth aspect of the present invention, wherein the conveying unit moves the plurality of containers along a cyclical path.

Here, the conveying unit cyclically moves the plurality of containers that are conveyed inside the conveying device.

Accordingly, it is possible to first stock inside the conveying device, for example, the plurality of containers in which weighed articles are stored, and then to discharge these articles. As a result, when the conveying device of the present invention is provided, for example, in the combination weighing device, the conveying device can function as a stocking unit for the containers until a selection of the containers is made based on the results of combination calculation. Once the selection is made, the conveying device can function as the discharge unit.

A conveying device according to a twelfth aspect of the present invention is the conveying device according to the eleventh aspect of the present invention, wherein the cyclical path of the containers, which is formed by the conveying unit, is formed in a substantially horizontal plane.

Here, each process such as changing the order of the containers, weighing, stocking, and discharging is performed while the containers are being moved in the horizontal plane.

Accordingly, the conveying device of the present invention can be made to function as a combination weighing device and a rank-order sorting device, without requiring much vertical space.

A conveying device according to a thirteenth aspect of the present invention is the conveying device according to any one of the ninth through the twelfth aspects of the present invention, wherein the conveying device further comprises a weighing unit that weighs the containers.

Here, for example, the weighing unit, which is included as a part of the conveying unit, weighs the articles that are stored in the containers being conveyed.

Accordingly, it is possible to weigh the articles stored in the containers while the containers are being conveyed. In particular, when the conveying unit is combined with the above-described discharging mechanism, each process such as weighing, stocking, and discharging can be performed in the conveying device while the plurality of containers are being conveyed.

A conveying device according to a fourteenth aspect of the present invention is the conveying device according to the thirteenth aspect of the present invention, wherein the conveying device further comprises a combination calculation unit that performs combination calculation using the results of weighing by the weighing unit.

Here, based on the results of weighing by the weighing unit, the combination calculation unit performs combination weighing calculation.

Accordingly, it will be possible to change the order of the selected containers and discharge the articles therefrom, based on the results of the combination calculation.

A conveying device according to a fifteenth aspect of the present invention is the conveying device according to the thirteenth or the fourteenth aspect of the present invention, wherein the order changing mechanism is one of a plurality of order changing mechanisms, and the weighing unit is disposed between the plurality of order changing mechanisms.

Here, the weighing unit is disposed between the plurality of order changing mechanisms that are provided for changing the order of the containers during conveyance.

Accordingly, the weighing unit can perform highly accurate weighing without being affected by the driving force generated from changing the order of the containers.

A conveying device according to a sixteenth aspect of the present invention is the conveying device according to any one of the ninth through the fifteenth aspects of the present invention, wherein the order changing mechanism includes support members that support the containers, and when changing the order of the containers, the order changing mechanism changes the order of the containers together with the support members.

Here, when changing the order of the containers, the order changing mechanism changes the order of the containers together with the support members that support the containers.

Accordingly, changing the order of the containers and the like can be performed in a more stable manner.

A combination weighing device according to a seventeenth aspect of the present invention comprises the conveying device according to any one of the ninth through the sixteenth aspects of the present invention.

Here, the conveying device of the present invention is applied to a combination weighing device.

Accordingly, it is possible, while conveying a plurality of containers, to perform combination calculation using the results of weighing the articles stored in the containers, and to discharge the articles from desired containers.

A quality control device according to a eighteenth aspect of the present invention comprises the conveying device according to any one of the ninth through the sixteenth aspects of the present invention and an inspection unit that is configured to inspect the quality of the articles dropped into the containers.

Here, the conveying device of the present invention is mounted in a quality inspection device such as a rank-order sorting apparatus and a seal checker.

Accordingly, the containers containing articles that are inspected by the quality inspection device can be arranged during conveyance, for example, in a rank order when the conveying device is mounted in a rank-order sorting apparatus. As a result, it will be possible to provide a quality inspection device, which is capable of speeding up the processes to be performed after the quality inspection is implemented by arranging the containers in the desired order during conveyance.

When the conveying device of the present invention is mounted, for example, in the combination weighing device, the order of a plurality of containers with weighed articles dropped therein can be changed during conveyance, and the containers can be arranged in the order in which the articles are discharged by combination weighing. Thus, the process in which the weighed articles are discharged from selected containers can be continuously performed, and consequently the process can be speeded up.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 14 is an elevation view illustrating how the container is supported by the container arrangement mechanism, which is included in the combination weighing device of FIG. 11 and is configured to change the order of the containers, distribute and distribute articles, and the like.

DETAILED DESCRIPTION OF THE PREFERRED EMBODIMENTS

Figure 1:
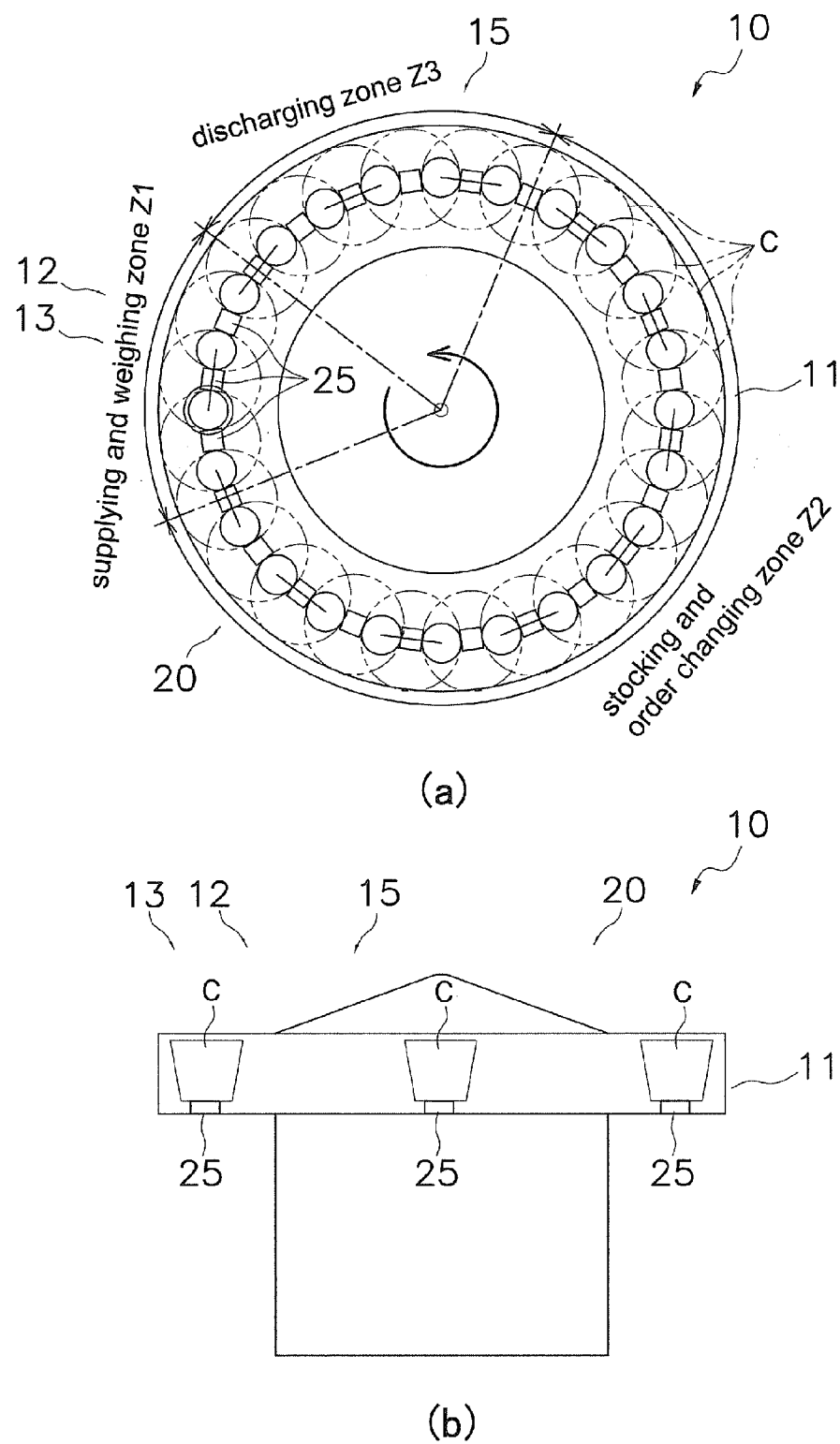
FIGS. 1(a) and 1(b) are respectively a plan view and an elevation view illustrating the configuration of a combination weighing device equipped with a conveying device according to an embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A combination weighing device equipped with a conveying device according to an embodiment of the present invention will now be described with reference to FIGS. 1 through 7.

Overall Configuration of the Combination Weighing Device

A combination weighing device 10 according to this embodiment is, as shown in FIGS. 1(a) and 1(b), a combination weighing device in which containers C placed on a plurality of weighers 25 fixedly disposed on a rotary table (conveying unit) 11 are weighed by each weigher 25 while the containers C are being rotatably moved by rotatably driving the rotary table 11. Then, based on the results of weighing by each weigher 25, a control unit 30 (refer to FIG. 7) performs a combination weighing calculation to select the desired containers C, and articles in these containers C are discharged therefrom. In this way, combination weighing is performed. In addition, the combination weighing device 10 comprises the rotary table 11, a supplying unit 12, a weighing unit 13, a discharge unit 15, a container arrangement mechanism (order changing mechanism) 20, and the control unit 30 (refer to FIG. 7).

The rotary table 11 is a circular plate-like member, and is rotatably driven by a rotary drive unit 23 (refer to FIG. 7) in a substantially horizontal plane around the center of the circular member. The plurality of weighers 25 (20 in the example shown in FIG. 2) are fixedly disposed on the top surface of the rotary table 11.

The supplying unit 12 drops articles into the containers C being rotated in a supplying and weighing zone Z1, which will be described below. Note that a supplying device such as a conveyor and a vibrating feeder may be used as the supplying unit 12.

The weighing unit 13 has a plurality of weighers 25. In the same supplying and weighing zone Z1 to be described below, the articles dropped into the containers C by the supplying unit 12 are weighed by the weighers 25. Note that the weighers 25 are load cells that weigh the containers C placed on their top portions.

As shown in FIGS. 3(b), 4(a), and the like, the container arrangement mechanism 20 is alternately disposed in the space between the weighers 25 (container C). By rotating a hook member 21 (refer to FIG. 4(a) and the like) in a substantially horizontal plane in a stocking and order changing zone Z2, which will be described below, the container arrangement mechanism 20 changes the order of two containers C that are adjacent to each other. Note that the configuration of this container arrangement mechanism 20 will be described in detail below.

In a discharging zone Z3, which will be described below, the discharge unit 15 discharges articles from the containers C that are selected based on a combination weighing calculation. At this time, the order of the containers C having articles therein that will participate in combination weighing has already been changed by the above-described container arrangement mechanism 20 such that they are collected together as a group. Therefore, when a group of the selected containers C is moved to the discharging zone Z3, the articles in these containers C can be continuously discharged therefrom.

Figure 7:
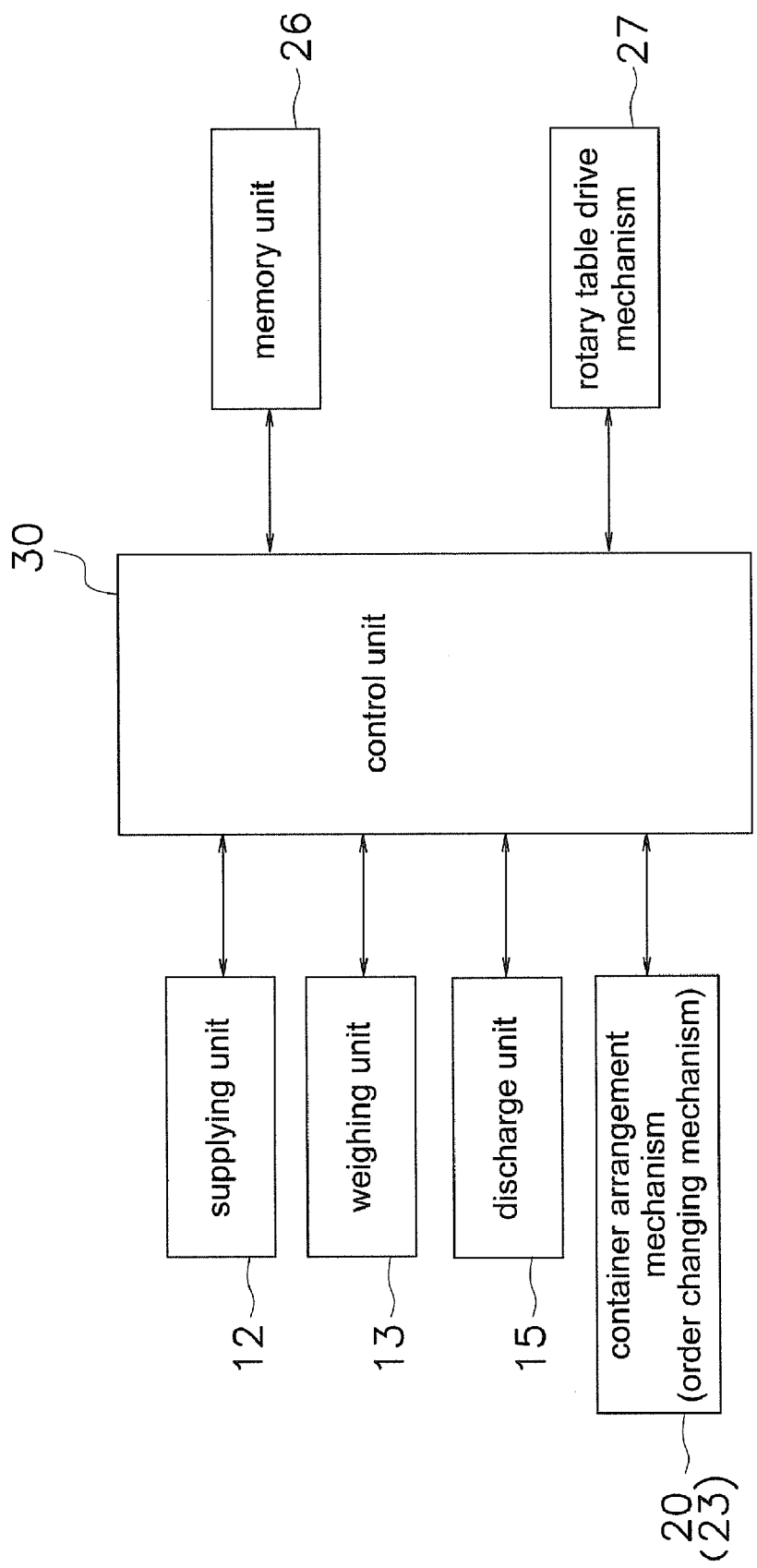
FIG. 7 is a block view illustrating a control block included in the combination weighing device of FIG. 1.

As shown in FIG. 7, the control unit 30 is connected to the supplying unit 12, the weighing unit 13, the discharge unit 15, the container order changing mechanism 20, a memory unit 26, and a rotary table drive mechanism 27, and the control unit 30 controls their operations according to various programs stored in the memory unit 26. Here, the memory unit 26 stores the relative locations of the containers C on the rotary table 11, wherein the containers C are those selected by combination weighing. Therefore, while checking the locations of the desired containers C stored in the memory unit 26, the control unit 30 controls the operation of the desired container arrangement mechanisms 20 such that the selected containers C are collected as a group.

In addition, with the combination weighing device 10 in this embodiment, each process such as supplying articles to the containers C, weighing the articles, changing the order of the containers C, and discharging the articles from the containers C, is performed by rotating the rotary table 11. Specifically, with the combination weighing device 10, as shown in FIGS. 1(a) and 2, the following three zones are formed on the rotary table 11: the supplying and weighing zone Z1, the stocking and order changing zone Z2, and the discharging zone Z3. More specifically, when the containers C are moved to the supplying and weighing zone Z1 in an empty state, i.e., without articles being supplied thereto, the supplying unit 12 supplies articles in a predetermined weight range to the empty containers C, then each weigher 25 weighs these containers C. At this time, since the weighers 25 have already weighed the containers C when they were empty, the weight of the articles dropped into each container C can be calculated by subtracting the weight of the container in an empty state from the weight of the container C with the articles inside. The control unit 30 (refer to FIG. 7) performs a combination weighing calculation using the weight of the articles calculated as described above. Next, based on the results of the combination weighing calculation performed by the control unit 30 by using the weights of a plurality of articles, the order of the containers C that are moved to the stocking and order changing zone Z2 is changed by the container arrangement mechanism 20 such that a plurality of selected containers C are continuously arranged. The containers C that have been arranged in a certain order by the container arrangement mechanism 20 in the stocking and order changing zone Z2 will be moved to the discharging zone Z3, where they will be caused to discharge the articles in that order by the discharge unit 15. Note that when the articles are to be discharged from the containers C by the discharge unit 15, this may be performed by turning the containers C upside down or by removing the entire container C from the rotary table 11. As described above, the articles that are discharged in the order of the arrangement of the containers C by the discharge unit 15 are supplied to a bag packaging machine and the like (not shown) disposed downstream, collected together such that they are in a predetermined weight range, and then packaged.

Configuration of the Container Arrangement Mechanism

The container arrangement mechanism 20 is a mechanism that changes the order of two containers C placed on the opposite sides thereof. As shown in FIGS. 3(b), 4(a), and the like, the container arrangement mechanism 20 is alternately provided in the space between the plurality of containers C disposed on the rotary table 11. The container arrangement mechanism 20 circularly moves with the containers C, together with the rotation of the rotary table 11. As shown in FIGS. 5(a) and 5(b), the container arrangement mechanism 20 has a hook member 21, a rotary shaft 22, and a rotary drive unit (drive unit) 23.

The hook member 21 has circular arc portions (a pair of holding portions) 21a that are formed to hold the containers C at the both ends of the hook member 21 and to convey the containers C. The circular arc portions 21a hold two adjacent containers C by hooking into a bottom portion C1 of each container C from the sides.

As shown in FIGS. 4(a) through 4(c), the rotary shaft 22 is alternately disposed in the space between the containers C (weighers 25), and is connected to the central portion of the hook member 21. The rotary shaft 22 receives a rotary driving force from the rotary drive unit 23 and rotates the hook member 21.

In order to cause the articles dropped into the containers C selected by the control 30 to be discharged in a predetermined order, the control unit 30 controls the rotary drive unit 23 such that the rotary drive unit 23 rotates the hook member 21 of the container arrangement mechanism 20 disposed between the containers C that need to be arranged in order. By repeatedly performing the above-described operations in the stocking and order changing zone Z2, the control unit 30 can change the order of the containers C to a desired order before they are moved to the discharging zone Z3.

In addition, as shown in FIG. 4(a), the container arrangement mechanism 20 is held in a standby state at an initial position. The initial position is a state in which the hook member 21 is oriented in a longitudinal direction along the radial direction of a circle that is formed by the rotation path of the containers C. Then, the container arrangement mechanism 20 circularly moves with the weigher 25 together with the rotation of the rotary table 11. When changing the order of the containers C, as shown in FIG. 4(b), the control unit 30 holds the containers C selected by a combination weighing calculation by hooking into the bottom portions C1 of the containers C with the hook members 21, at a position where the hook members 21 are rotated about 90 degrees from the initial position shown in FIG. 4(a). Then, the hook members 21 are further rotated about 180 degrees from the above-described position, and consequently the order of the mutually adjacent containers C is changed. Subsequently, as shown in FIG. 4(c), the control unit 30 rotates the hook members 21 about 90 degrees in the opposite direction, after which the control unit 30 stops and returns the hook members 21 back to the original initial position.

Operation in which the Order of the Containers C is Changed

Figure 6:
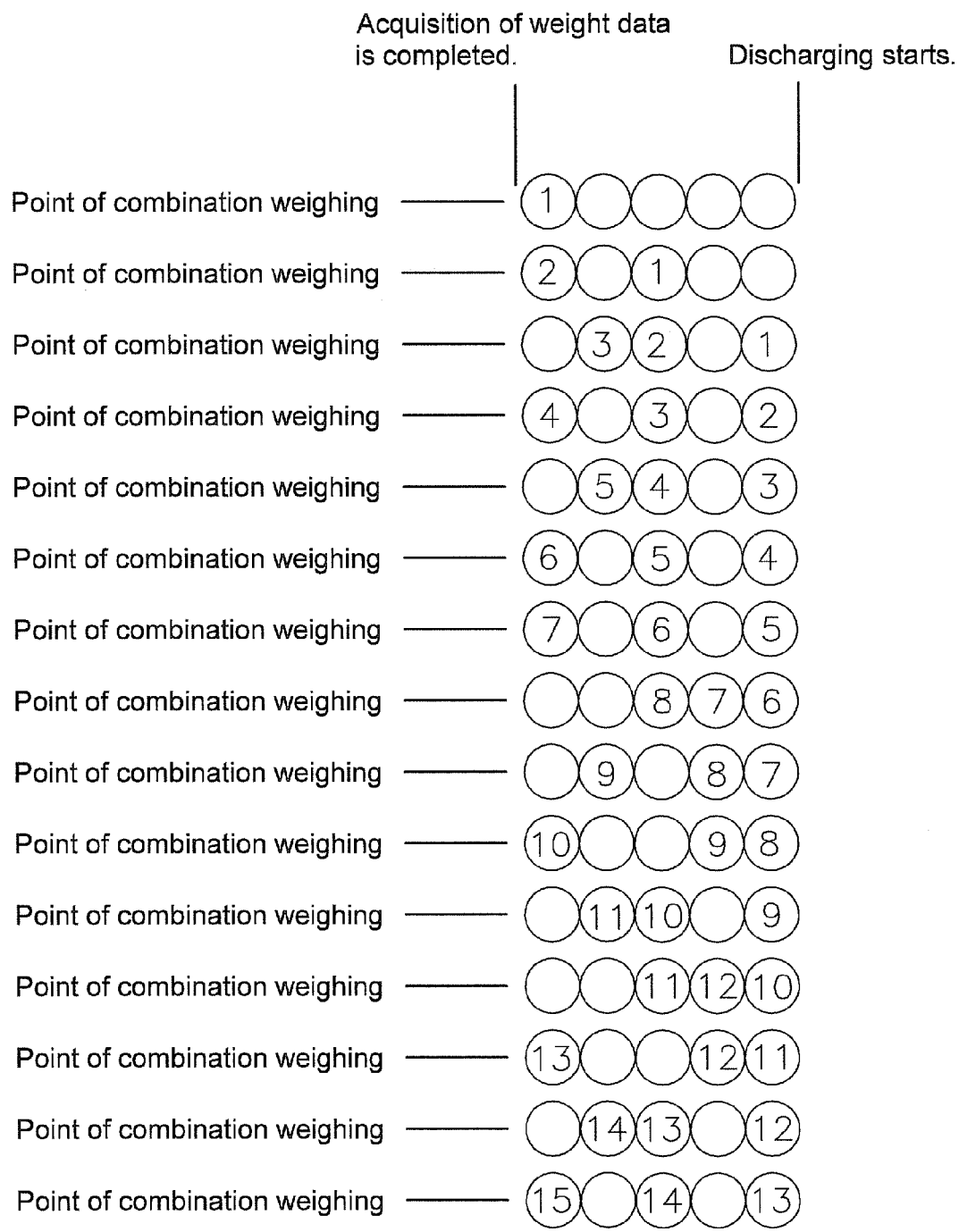
FIG. 6 is a view that describes how the containers are moved when the order of the containers is changed in the combination weighing device of FIG. 1.

Here, with reference to FIGS. 2 and 6, a description is given below of how the containers C selected by the control unit 30 in the combination weighing device 10 in this embodiment will be moved when these containers C are to be arranged in a desired order. Note that the numbers shown in FIG. 6 are the numbers assigned by the control unit 30 to indicate the order in which articles in the containers C are discharged. The numbers indicate that the containers C are moved from the top row to the bottom row as time progresses. When the order of the containers C is not changed, the containers C will be moved to the downstream side one by one by the rotation of the rotary table 11. When the order of the containers C is changed, the containers C will be moved to the downstream side by twos. For example, when it is desired to combine three or four different weights for a combination weighing calculation and discharge articles based on the combination, it is necessary to determine the order of the containers C in which the articles in a predetermined weight range will be gathered into a group and discharged. Therefore, in this embodiment, combination weighing is performed, for example, by changing the order of the containers C such that the articles in a predetermined weight range are continuously discharged into the bag packaging machine and the like disposed downstream.

Specifically, in the supplying and weighing zone Z1, the control unit 30 obtains from each weigher 25 the weight of the articles weighed by each weigher 25, and then performs a combination weighing calculation. Then, when the acquisition of data concerning the weights of the articles is completed, in the stocking and order changing zone Z2, the container arrangement mechanism 20 is controlled such that the containers C are arranged in the desired order.

More specifically, as shown in FIG. 6, once the control unit 30 receives in the discharging zone Z3 a container C whose sequence number indicating the discharge order is 1, the control unit 30 changes the order of the container C numbered 1 and a container C located in front thereof in the conveying direction (hereinafter simply referred to as "in front thereof"). The above-described change in the order is performed so as to enable the container C numbered 1 to reach the discharge position as soon as possible.

Next, the control unit 30 receives a container C whose sequence number indicating the discharge order is 2, and also changes the order of the container C numbered 1 and the container C in front thereof. The control unit 30 further changes the order of the container C numbered 2 and the container C in front thereof. Accordingly, the containers C numbered 1 and numbered 2 can be moved to the discharge position as soon as possible. Here, when the container C numbered 1 is moved to the discharge position, the articles are discharged from the container C numbered 1. Note that the container C numbered 1 that became empty will be moved to the supplying and weighing zone Z1, and there, the articles will be supplied thereto again and weighing will be performed.

Next, the control unit 30 receives a container C numbered 4, and changes the order of the container C numbered 2 and the container C in front thereof. Then, the control unit 30 drives the discharge unit 15, and causes the articles to be discharged from the container C numbered 2, which is moved to the discharge position.

Next, the control unit 30 receives a container C numbered 5, and changes the order of the container C numbered 3 and the container C in front thereof and the order of the container C numbered 4 and the container C in front thereof. Then the control unit 30 drives the discharge unit 15, and causes the articles of the container C numbered 3, which is moved to the discharge position, to be discharged therefrom.

Next, the control unit 30 receives a container C numbered 6, and changes the order of the container C numbered 4 and the container C in front thereof. Then, the control unit 30 causes the articles to be discharged from the container C numbered 4, which is moved to the discharge position.

Likewise, by changing the order of the containers C that are specified by the control unit 30 to discharge the articles therein in a certain order, it will be possible to discharge the articles in the desired discharge order.

Figure 2:
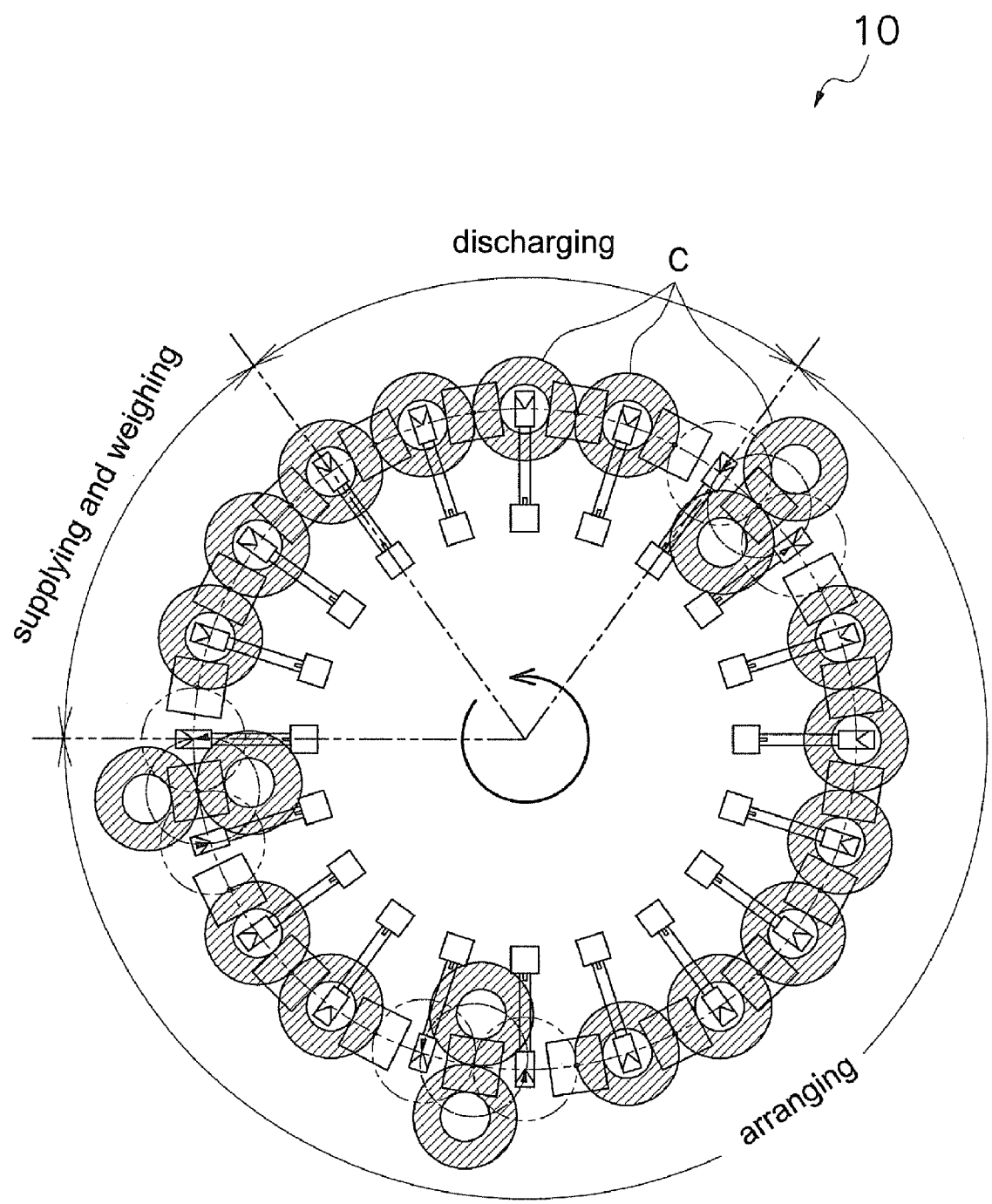
FIG. 2 describes each process in the combination weighing device of FIG. 1.
Figure 3:
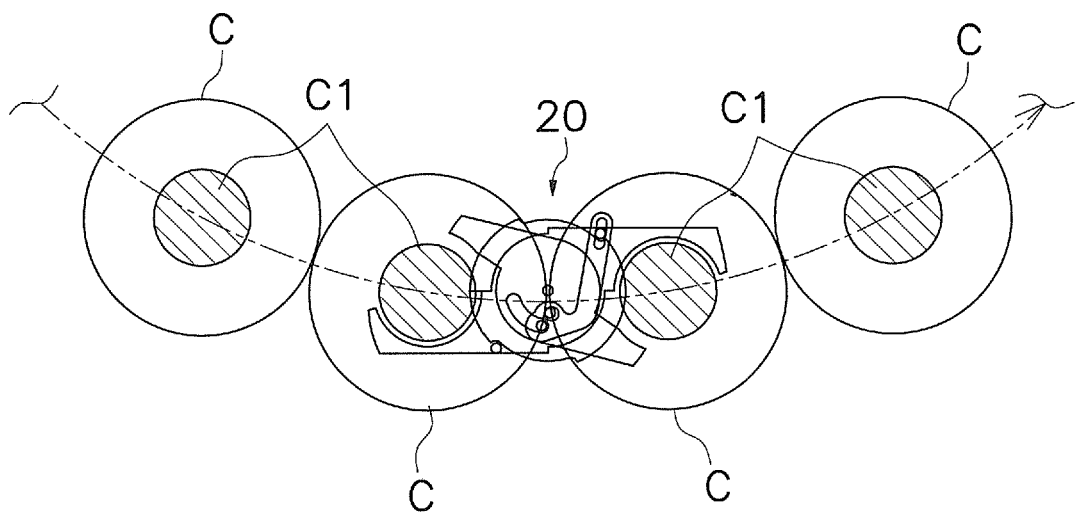
FIGS. 3(a) and 3(b) are respectively a plan view and an elevation view illustrating positional relationships between containers C and container arrangement mechanisms that each changes the order of the containers C in the combination weighing device of FIG. 1.
Figure 3:
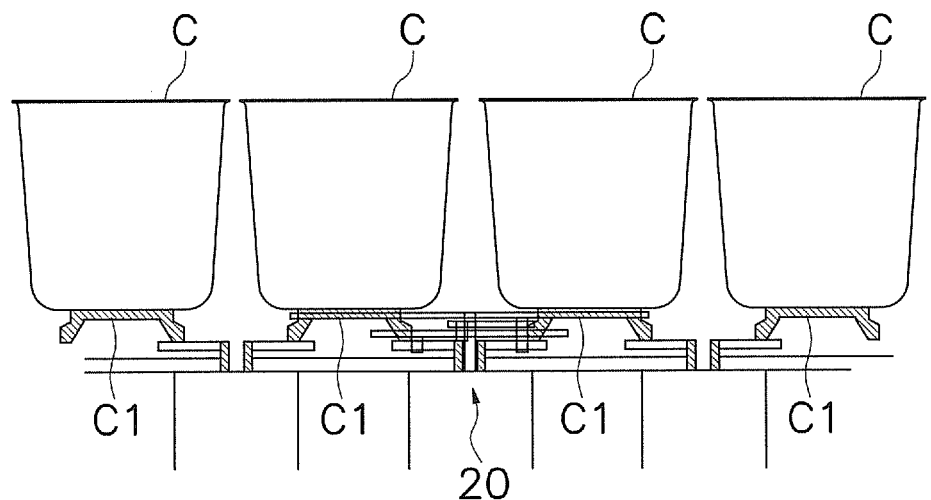
Figure 4:
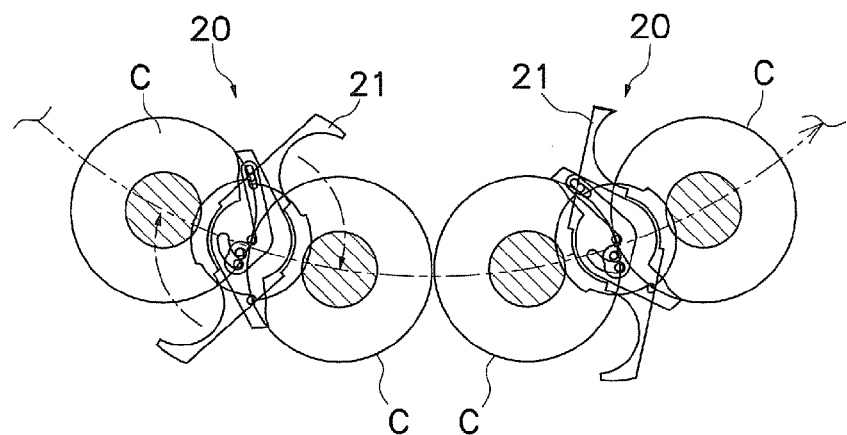
FIGS. 4(a) through 4(c) are plan views illustrating the operation of the container arrangement mechanisms, in which the order of the containers is changed in the combination weighing device of FIG. 1.
Figure 4:
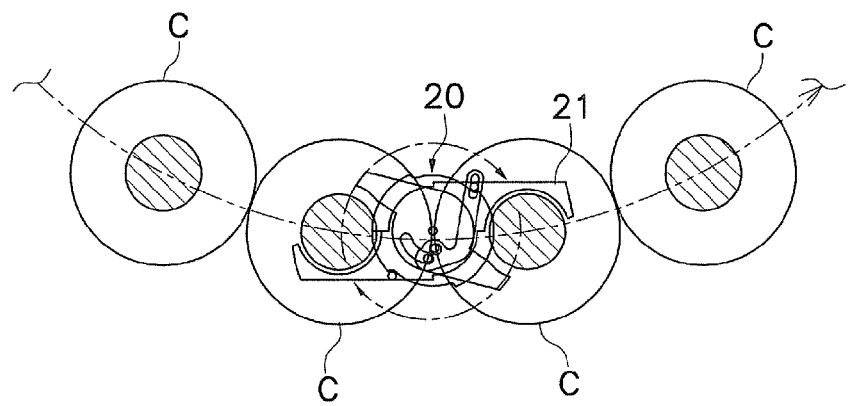
Figure 4:
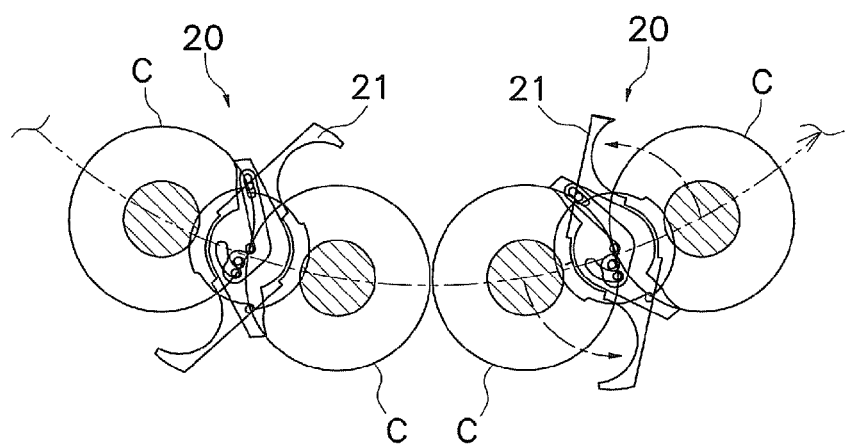
Figure 5:
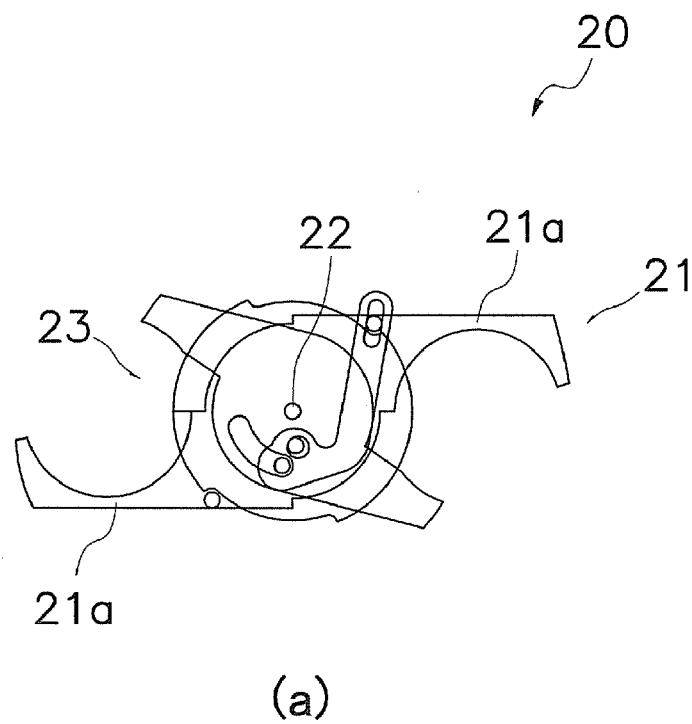
FIGS. 5(a) and 5(b) are respectively a plan view and an elevation view illustrating a detailed configuration of the container arrangement mechanism of FIG. 3.
Figure 5:
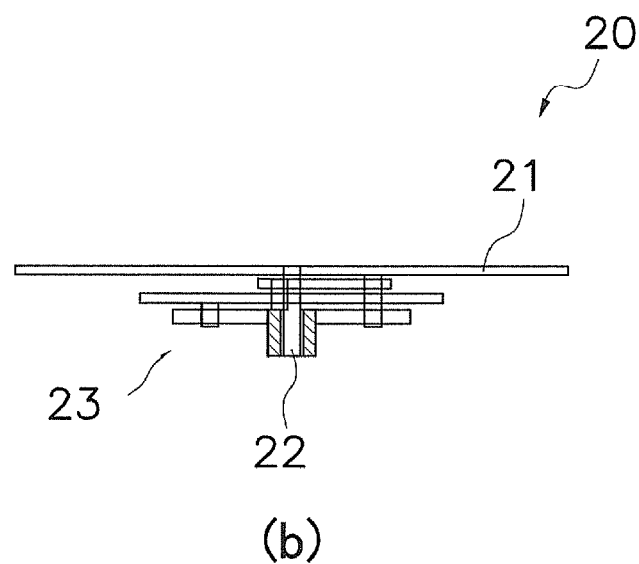

Characteristics of the Combination Weighing Device (1) As shown in FIG. 1, the combination weighing device 10 in this embodiment comprises the rotary table 11, the plurality of containers C placed on the rotary table 11, the supplying unit 12 that supplies articles to the containers C, the weighing unit 13 that weighs the articles dropped into the containers C, and the discharge unit 15 that discharges the articles from the containers C. Then, as shown in FIGS. 4(a) through 4(c), the combination weighing device 10 rotatably drives the rotary table 11 and consequently moves the plurality of containers C placed on the rotary table 11. While doing so, through the container arrangement mechanism 20, the combination weighing device 10 changes the sequential order of the containers C that are specified by the control unit 30.

In this way, combination weighing can be efficiently performed by arranging the order of a plurality of containers C with the weighed articles dropped therein in the order in which the articles are discharged before the containers C are conveyed to the discharge position.

(2) With the combination weighing device 10 in this embodiment, the container arrangement mechanism 20 changes the order of two containers C that are in mutually adjacent positions.

Accordingly, it is possible to simplify the drive control of the container arrangement mechanism 20 performed by the control unit 30 when arranging a plurality of containers C being conveyed in a desired order.

(3) With the combination weighing device 10 in this embodiment, the container arrangement mechanism 20 comprises the hook member 21 having the pair of circular arc portion 21a at both ends thereof, the rotary shaft 22 that rotates the hook member 21, and the rotary drive unit 23 configured to impart a rotary driving force to the rotary shaft 22.

Accordingly, the hook member 21 is rotated around the rotary shaft 22 by the rotary drive unit 23, which consequently enables the circular arc portions 21a formed at both ends of the hook portion 21 to hold the containers C by hooking into the bottom portions C1 of the containers C from the sides. Then, the circular arc portions 21a rotate about 180 degrees, holding the containers C. In this way, changing the order of the containers C is accomplished.

(4) With the combination weighing device 10 in this embodiment, the container arrangement mechanism 20 that changes the order of the arrangement of the containers C being conveyed is disposed along the conveying path of the containers C.

Accordingly, the order of the containers C can be easily changed by rotating the hook member 21 when the desired containers C are conveyed to the position of the container arrangement mechanism 20.

In addition, in this embodiment, when the container arrangement mechanism 20 rotatably moves with the containers C on the rotary table 11, the order of the containers C can be changed by rotating a desired hook member 21 wherever the containers C are, so that the order of desired containers C can be more easily changed.

(5) With the combination weighing device 10 in this embodiment, the container arrangement mechanism 20 changes the order of the containers C by rotating the hook member 21 in the horizontal plane.

Accordingly, since the containers C will be moved in the horizontal plane, it is possible to prevent the occurrence of a problem in which the articles supplied into the containers C are thrown out therefrom. Consequently, the containers C can be conveyed and arranged in order in a stable manner.

(6) The combination weighing device 10 in this embodiment includes the plurality of container arrangement mechanisms 20 that are disposed along the conveying path of the containers C.

Accordingly, since the order of the plurality of containers C can be changed simultaneously by rotating the plurality of hook members 21, the order of the containers C can be more efficiently changed to a desired order.

Second Embodiment

A combination weighing device equipped with a conveying device according to another embodiment of the present invention will now be described with reference to FIGS. 11 through 22.

Overall Configuration of the Combination Weighing Device

Figure 11:
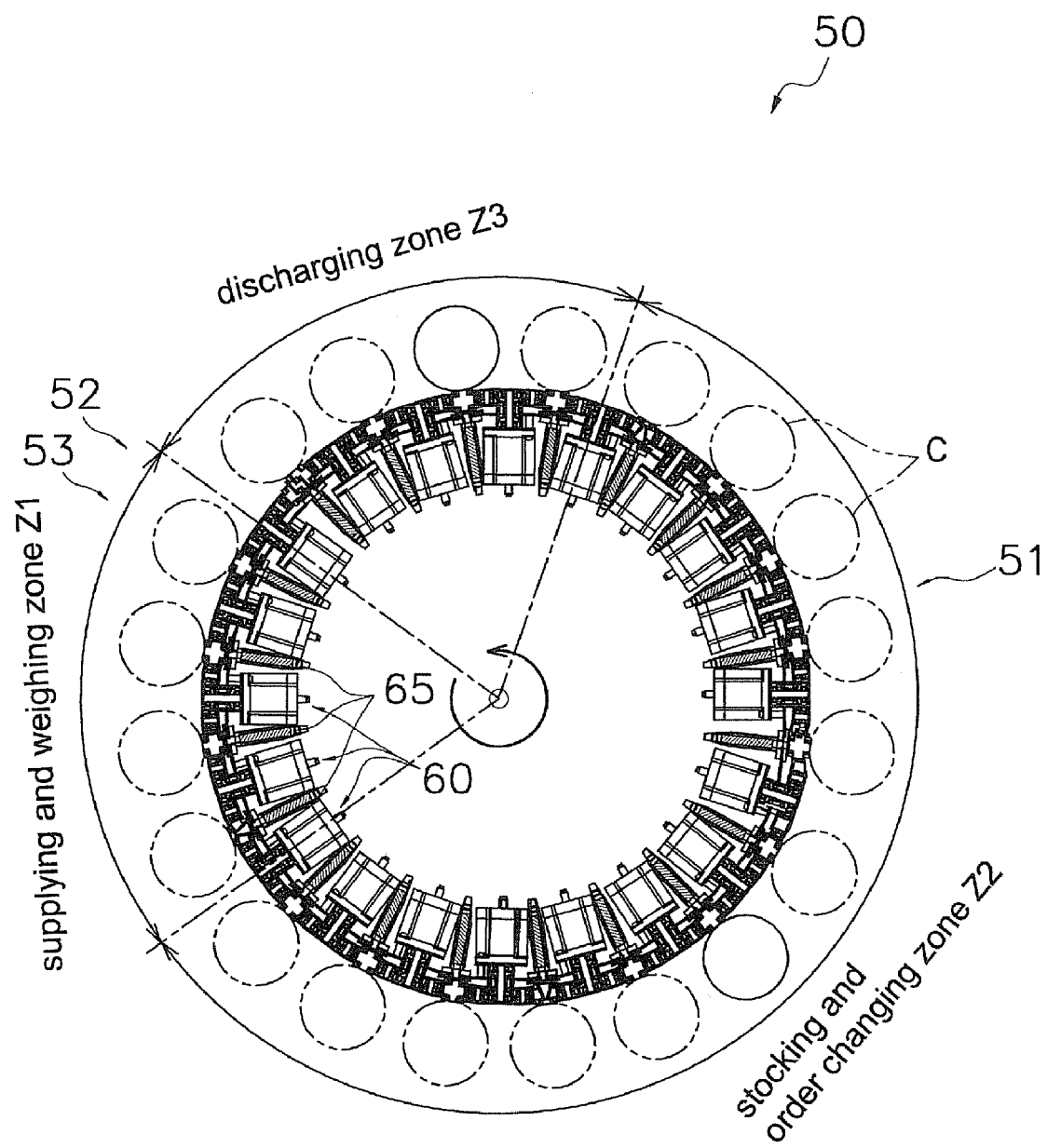
FIG. 11 is a plan view illustrating the overall configuration of a combination weighing device equipped with a conveying device according to yet another embodiment of the present invention.

A combination weighing device 50 according to this embodiment is, as shown in FIG. 11, a combination weighing device in which containers C placed on a plurality of weighers 65 fixedly disposed on a rotor (conveying unit) 51 are weighed by each weigher 65 while the containers C are being circularly moved. With the combination weighing device 50, based on the results of weighing by each weigher 65, a control unit (control unit, a combination calculation unit) 90 (refer to FIG. 17) performs a combination weighing calculation, selects the desired containers C, then discharges articles from the selected containers C. Consequently, in this way, combination weighing is performed. In addition, the combination weighing device 50 comprises the rotor 51, a supplying unit 52, a weighing unit 53, container arrangement mechanisms (order changing mechanism, the rotating mechanism, distribution mechanism) 60, and the control unit 90 (refer to FIG. 17).

The rotor 51 is a circular plate-like member, and configured to circularly move the weighing units 53, the container arrangement mechanisms 60, and the like by the rotary drive unit 63 (refer to FIG. 17) in a substantially horizontal plane around the center of the circular plate-like member. By so doing, the rotor 51 forms a cyclical path along which the containers C are moved in a substantially horizontal plane.

The supplying unit 52 drops articles into the containers C being rotated in a supplying and weighing zone Z1, which will be described below. Note that as the supplying unit 52, for example, a supplying device such as a conveyor unit and a vibrating feeder may be used.

The weighing unit 53 has a plurality of weighers 65 that are each disposed in the space between a plurality of container arrangement mechanisms 60, which will be described below. With the weighing unit 53, the articles that are dropped into the containers C by the supplying unit 52 are weighed in the supplying and weighing zone Z1, which will be described below. Note that weighers 65 are load cells 65a (refer to FIGS. 12 and 13) that weigh the containers C placed on portions that support the containers C.

As shown in FIG. 11 and the like, the container arrangement mechanisms 60 are disposed in the space between each of the weighers 65 (containers C). By rotating a hook member 61 (refer to FIG. 14 and the like) in a substantially vertical plane in a stocking and order changing zone Z2, which will be described below, each container arrangement mechanism 60 changes the order of two mutually adjacent containers C by moving along a substantially vertical plane. In addition, in a discharging zone Z3, which will be described below, the container arrangement mechanism 60 vertically inverts the containers C selected based on a combination weighing calculation, in order to discharge the articles from the containers C. At this time, the order of the containers C containing the articles to be discharged has already been arranged by the container arrangement mechanisms 60 such that the articles selected by combination weighing are collected together. Consequently, when a group of the selected containers C is moved to the discharging zone Z3, the articles selected by combination weighing can be discharged to the downstream side simply by rotating a plurality of containers C and continuously discharging the articles. Note that a detailed description will be given below of a specific configuration of the container arrangement mechanism 60, changing the order of the containers, collecting articles in one container, and discharging the articles.

Figure 17:
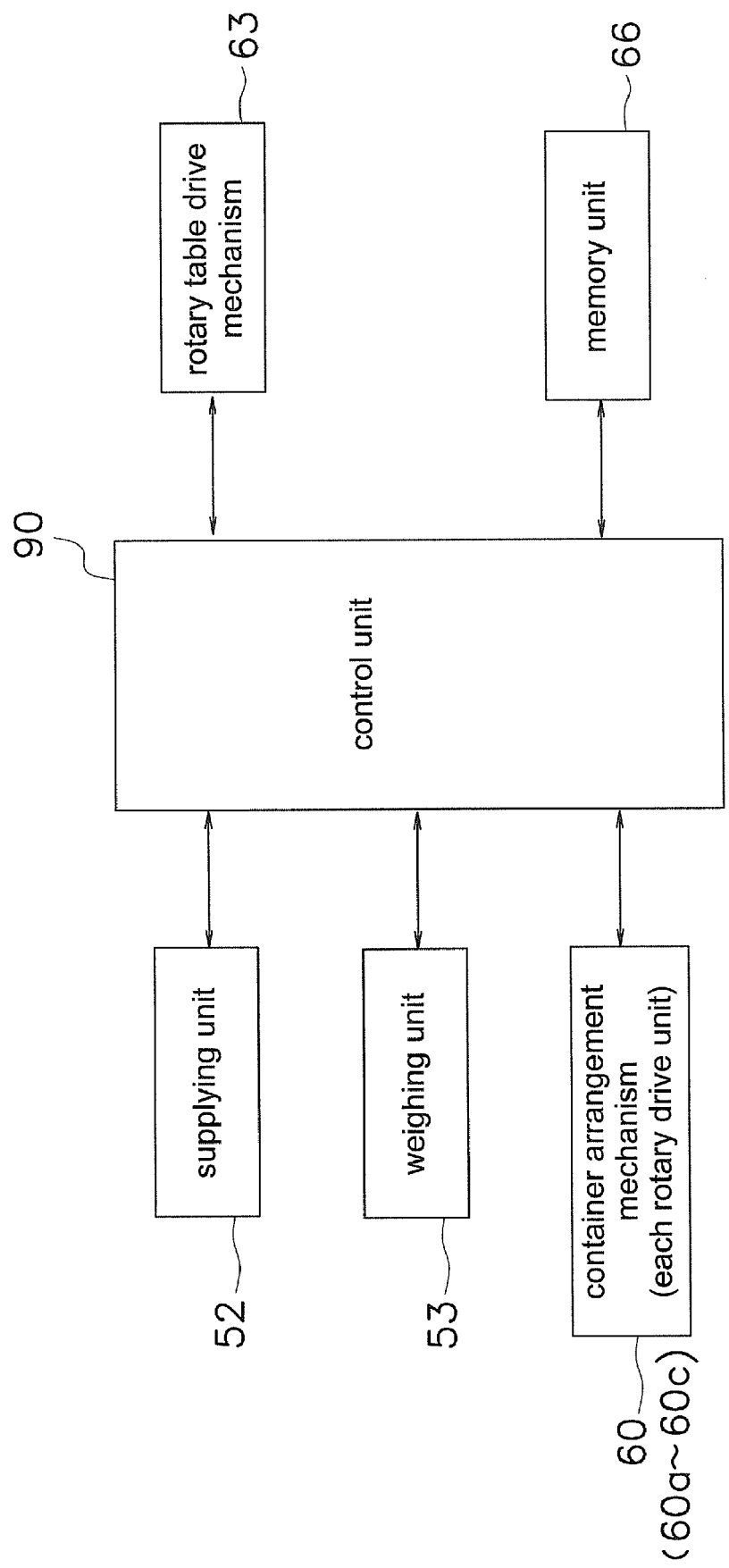
FIG. 17 is a block view illustrating a control block included in the combination weighing device of FIG. 11.

As shown in FIG. 17, the control unit 90 is connected to the supplying unit 52, the weighing unit 53, the container arrangement mechanism 60, the rotary drive unit 63, and a memory unit 66, and the control unit 90 controls their operations according to various programs stored in the memory unit 66. Here, the memory unit 66 stores relative locations of the containers C in the rotor 51, wherein the containers C are the ones selected by combination weighing. Therefore, while checking the locations of desired containers C stored in the memory unit 66, the control unit 90 controls the operation of desired container arrangement mechanisms 60 such that the selected containers C are collected as a group.

In addition, with the combination weighing device 50 in this embodiment, each process such as supplying articles to the containers C, weighing the articles, changing the order of the containers C, and discharging the articles from the containers C, is performed by rotating a plurality of containers C by the rotor 51. Specifically, with the combination weighing device 50, as shown in FIG. 11, the following three zones are formed: the supplying and weighing zone Z1, the stocking and order changing zone Z2, and the discharging zone Z3. More specifically, when the containers C are moved to the supplying and weighing zone Z1 in an empty state, i.e., without articles being supplied thereto, the supplying unit 52 supplies a predetermined amount of articles to the empty containers C in the supplying and weighing zone Z1, then each weigher 65 weighs these containers C. At this time, since the weighers 65 have already weighed the containers C when they were empty, the weight of the articles dropped into each container C can be calculated by subtracting the weight of the container C in an empty state from the weight of the container C with the articles dropped therein. The control unit 90 (refer to FIG. 17) performs a combination weighing calculation by using the weights of the articles calculated as described above. Next, based on the results of the combination weighing calculation carried out by the control unit 90 by using the weights of a plurality of articles, the order of the containers C that are moved to the stocking and order changing zone Z2 is changed by the container arrangement mechanisms 60 such that a plurality of selected containers C are continuously arranged. The containers C that have already been arranged in a certain order by the container arrangement mechanisms 60 in the stocking and order changing zone Z2 will be moved to the discharging zone Z3, where they will be rotated by the container arrangement mechanisms 60 and the articles will be discharged from the containers C in that certain order. As described above, the articles discharged from the containers C are supplied to a bag packaging machine and the like (not shown) disposed downstream, and the articles are packaged such that they are in a predetermined weight range.

Configuration of the Container Arrangement Mechanism

Figure 14:
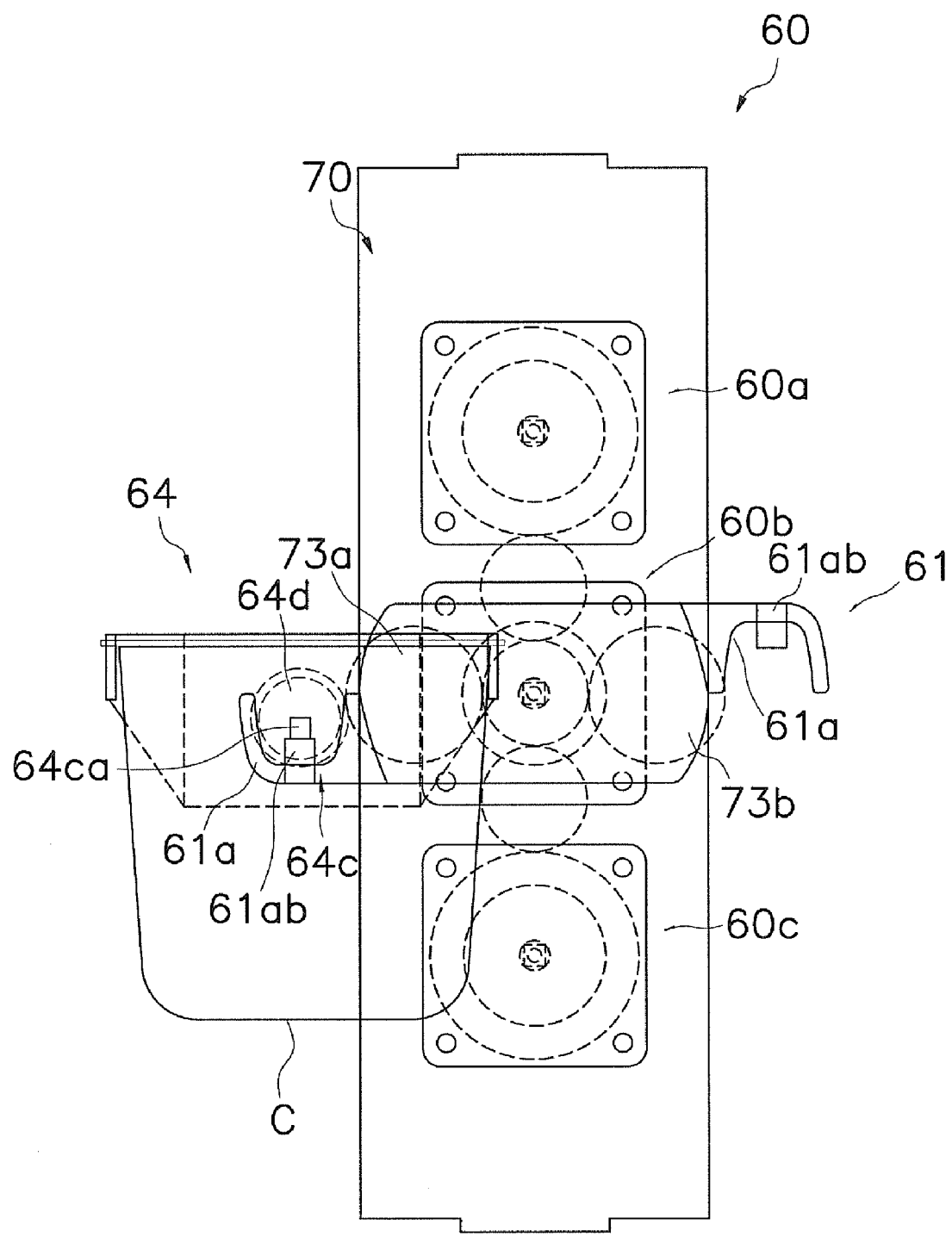
Figure 15:
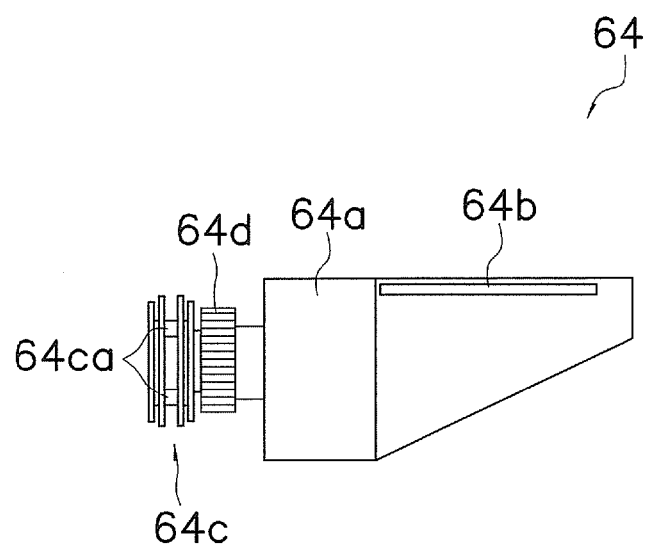
FIGS. 15(a) and 15(b) are respectively a lateral view and an elevation view illustrating the configuration of a support mechanism that is moved together with the containers by the container arrangement mechanism of FIG. 13.
Figure 15:
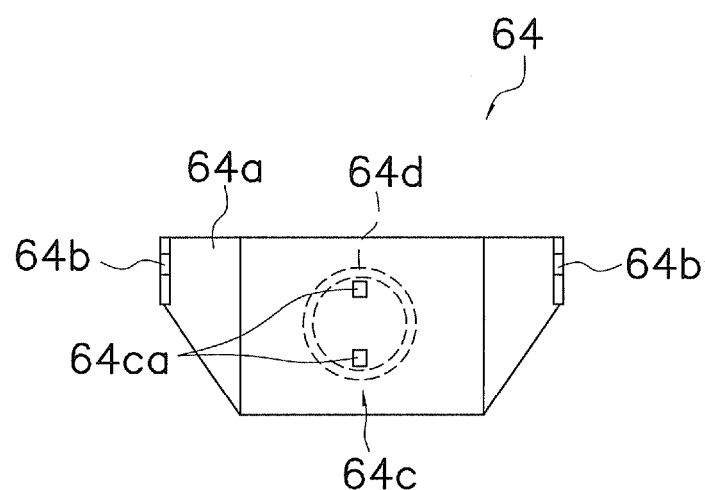
Figure 16:
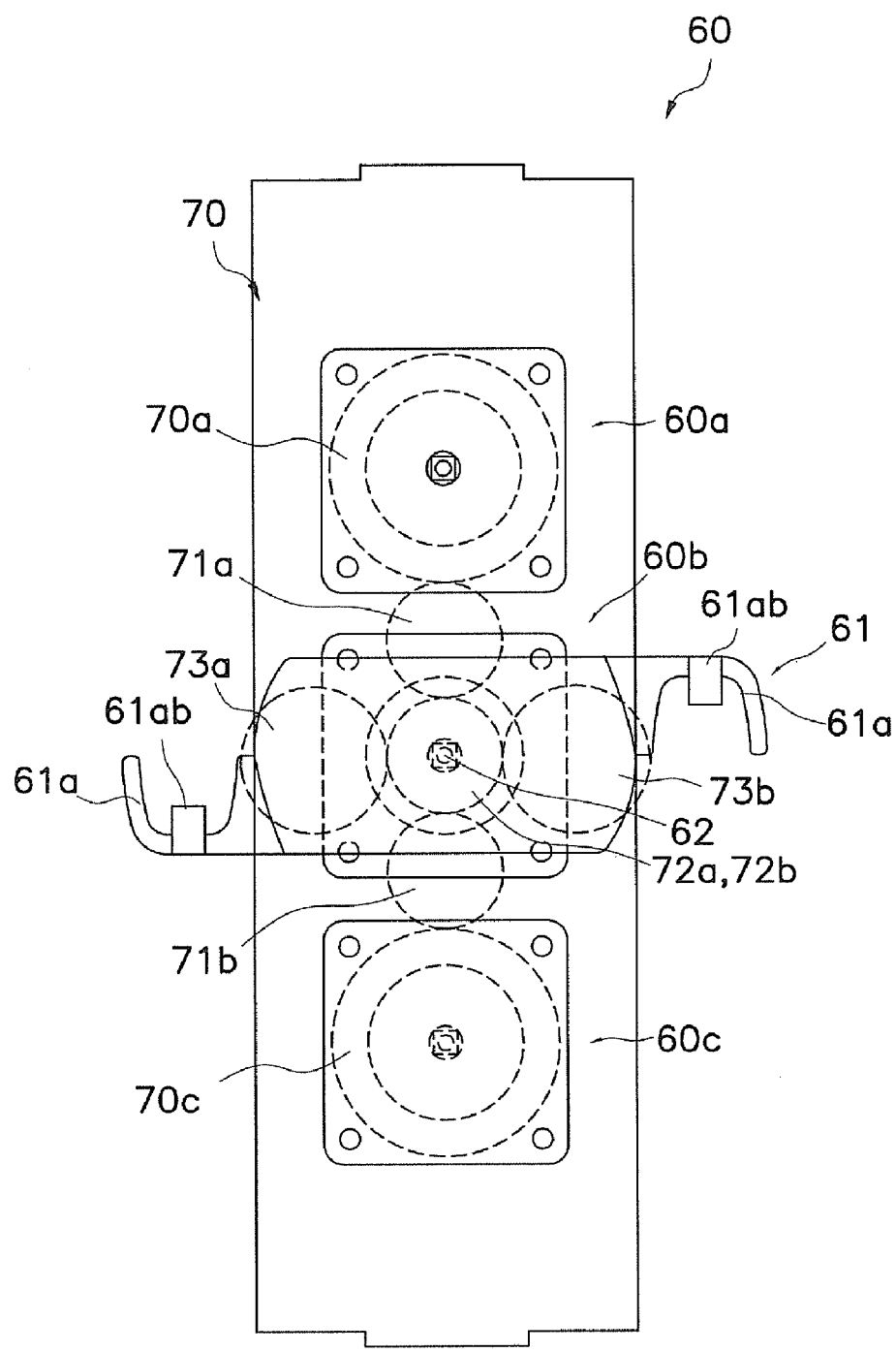
FIG. 16 is an elevation view illustrating the configuration of the container arrangement mechanism that changes the order of the containers, distributes and discharges articles, and the like in the combination weighing device of FIG. 11.

Each container arrangement mechanism 60 serves three different functions as follows: an order changing mechanism (refer to FIGS. 18 and 19) that changes the order of two containers C that are disposed in mutually adjacent positions; a distribution mechanism (refer to FIGS. 20(*a*) through 20(*d*)) that distributes a portion or the entirety of the articles from the container C to its adjacent container C, and a discharging mechanism (refer to FIG. 21) that discharges the articles from the containers C. In addition, as shown in FIG. 11 and the like, the container arrangement mechanisms 60 are disposed in the space between the weighers 65, and are configured to circularly move with the containers C by the rotary drive of the rotor 51. As shown in FIGS. 14 and 16, each container arrangement mechanism 60 comprises three rotary drive units 60*a* through 60*c* disposed in a substantially vertical direction, the hook member 61 that is rotatably driven by the rotary drive unit 60*b*, a rotary shaft 62 that is the rotation center of the hook member 61, and a transmission mechanism 70 that transmits the rotation of the rotary shaft 62.

As shown in FIG. 16, the rotary drive unit 60*a* rotates a gear 70*a* to rotatably drive a gear 71*a* that engages with the gear 70*a*, and consequently rotates a reversing gear 73*a* via a gear 72*a*. Here, the reversing gear 73*a* engages with a container rotary gear 64*d* included in a support mechanism (support member) 64. Consequently, the reversing gear 73*a* is rotated, and it will thereby be possible to rotate the container C that is supported on the left side of the hook member 61 in the figure. In other words, it is possible, by driving the rotary drive unit 60*a*, to vertically invert the orientation of the container C that is supported on one side of the hook member 61. It is also possible to rotate the container C by a desired degree.

As shown in FIG. 16, the rotary drive unit 60*b* rotatably drives the rotary shaft 62 that is the rotation center of the hook member 61, in order to rotate the hook member 61 in a substantially vertical direction.

As shown in FIG. 16, the rotary drive unit 60*c* rotates a gear 70*c* to rotatably drive a gear 71*b* that engages with the gear 70*c*, and consequently rotates a reversing gear 73*b* via a gear 72*b*. Here, as with the reversing gear 73*a*, the reversing gear 73*b* engages with the container rotary gear 64*d* included in the support mechanism (support member) 64. Consequently, by rotating the reversing gear 73*b*, it will be possible to rotate the container C that is supported on the right side of the hook member 61 in the figure. In other words, it is possible, by driving the rotary drive unit 60*c*, to vertically invert the orientation of the container C that is supported on another side of the hook member 61. It is also possible to rotate the container C by a desired degree.

With the combination weighing device 50 in this embodiment, by adequately controlling the rotary drive of these rotary drive units 60*a* through 60*c*, it is possible to change the order of the containers C that are supported at both ends of the hook member 61, distribute and discharge the articles stored in these containers C, and the like. Note that a detailed description is given below of the change in the order of the containers C, rotation, and rotation control, which are performed by using these rotary drive units 60*a* to 60*c*.

The hook member 61 includes circular arc portions 61*a* formed to hold and convey the containers C at both ends thereof, and magnets 61*ab* that hold the containers C at the circular arc portions 61*a*. The circular arc portions 61*a* hold two containers C at both ends of the hook member 61 by hooking into the top and the bottom of a supported portion 64*c* of the support mechanism 64 that supports the containers C. Each magnet 61*ab* is attached near each circular arc portion 61*a*. The magnets 61*ab* and magnets 64*ca* that are included in the support mechanism 64 attract each other.

As shown in FIGS. 14 and 16, the rotary shaft 62 is disposed as the axis of the rotary drive unit 60*b*, and is connected to the central portion of the hook member 61. The rotary shaft 62 receives the rotary driving force from the rotary drive unit 60*b*, and rotates the hook member 61 in a substantially vertical direction.

Configuration of the Transmission Mechanism

The transmission mechanism 70 is formed by combining a plurality of gears, and transmits the rotary driving force of the rotary drive units 60*a* and 60*c* to the container rotary gear 64*d* (container C) of the support mechanism 64 that is supported by the hook member 61. Specifically, as shown in FIG. 16, the transmission mechanism 70 has the gears 70*a* and 70*c*, the gears 71*a* and 71*b*, the gears 72*a* and 72*b*, and the reversing gear 73*a* and 73*b*.

The gears 70*a* and 70*c* are respectively attached to the rotary shafts of the rotary drive units 60*a* and 60*c*.

The gears 71*a* and 71*b* respectively engage with the gears 70*a* and 70*c*, and transmit the rotary driving force of the rotary drive units 60*a* and 60*c* to the gears 72*a* and 72*b*.

The gears 72*a* and 72*b* are rotary gears of the same size, which are concentrically disposed such that they are adjacent to each other. They respectively engage with the gears 71*a* and 71*b*. The gears 72*a* and 72*b* transmit the rotary driving force transmitted from the gears 71*a* and 71*b* to the reversing gear 73*a* on the left side of the figure and the reversing gear 73*b* on the right side of the figure, respectively.

The reversing gears 73*a* and 73*b* are gears that are fixedly disposed on the back side of the hook member 61. When the hook member 61 rotates, the reversing gears 73*a* and 73*b* rotate around the rotary shaft 62, with the gears 72*a* and 72*b* being engaged. The reversing gear 73*a* is configured to engage with the container rotary gear 64*d* included in the support mechanism 64 when the support mechanism 64 becomes supported by the hook member 61 specifically at the circular arc portion 61a on the left side of the figure. On the other hand, the reversing gear 73b is configured to engage with the container rotary gear 64d included in the support mechanism 64 when the support mechanism 64 becomes supported by the hook member 61 specifically at the circular arc portion 61a on the right side of the figure. Accordingly, by rotating either one of the reversing gears 73a or 73b, the support mechanism 64, which is supported by the hook member 61 specifically at the circular arc portions 61a formed at both ends of the hook member 61, can be rotated together with the container C.

Configuration of the Support Mechanism

Figure 13:
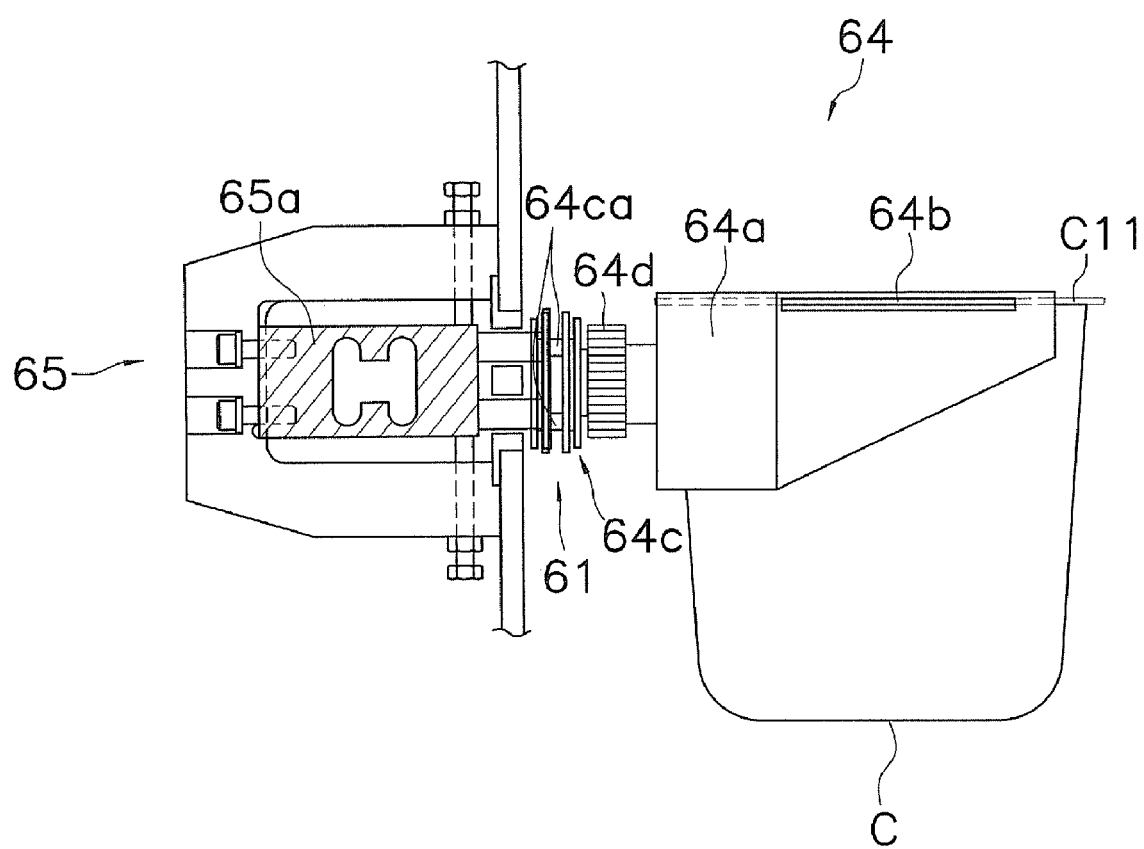
FIG. 13 is a lateral view illustrating a container that is supported by the weigher of FIG. 12.

As shown in FIG. 13, the support mechanism 64 supports the container C, and is moved together with the container C over the hook member 61 by the container arrangement mechanism 60. Further, as shown in FIGS. 15(a) and 15(b), the support mechanism 64 has a container supporting portion 64a, an opening portion 64b, the supported portion 64c, and the container rotary gear 64d.

The container supporting portion 64a is a U-shaped sheet metal member, and is disposed along the sides of the container C.

As shown in FIGS. 13, 15(a), and 15(b), the opening portion 64b is formed on both sides of the container supporting portion 64a, that is a U-shaped sheet metal member. The container C is supported by the container supporting portion 64a as a flange portion C 11 of the container C is inserted to each opening portion 64b.

The supported portion 64c is disposed on the furthest end of the support mechanism 64, and as shown in FIG. 14, the supported portion 64c is supported by the circular arc portions 61a of the hook member 61.

The container rotary gear 64d engages with either one of the reversing gears 73a or 73b, both of which are attached to the back side of the hook member 61 when the support mechanism 64 becomes supported by the hook member 61. Accordingly, with the rotary drive by the rotary drive unit 60a or the rotary drive unit 60c, the container C can be rotated together with the support mechanism 64 around the center of the container rotary gear 64d, with the container C being supported at the circular arc portions 61a of the hook member 61.

Operation in which the Order of the Containers is Changed

Here, with reference to FIGS. 18(a) through 18(e) and FIGS. 19(a) through 19(e), a description is given below of how the container arrangement mechanism 60 and the containers C in the combination weighing device 50 in this embodiment will be moved when the order of the containers C selected by the control unit 90 is changed to a desired order.

First, in the supplying and weighing zone Z1, the control unit 90 obtains from each weigher 65 the weight of the articles weighed by each weigher 65, and then performs a combination weighing calculation. Then, when the acquisition of data concerning the weight is complete, in the stocking and order changing zone Z2, the container arrangement mechanisms 60 are controlled such that the containers C are arranged in the desired order.

Specifically, as shown in FIG. 18(a), when changing the order of two containers C held by the hook member 61 on the right side of the figure, more specifically at the circular arc portions 61a at both ends of the hook member 61, the control unit 90 controls the container arrangement mechanism 60 such that the adjacent hook member 61 on the left side of the figure in an initial state in a substantially horizontal direction is rotated about 45 degrees counter-clockwise and stopped there, as shown in FIG. 18(b). At this time, as described above, the rotary drive of the hook member 61 is performed by the rotary drive unit 60b that drives the rotary shaft 62 that is the rotation center of the hook member 61.

Note that, as shown in FIG. 18(a), the container C held between the hook members 61 on the left and right sides of the figure is held by the magnets 61ab that are attached to the hook members 61 on both left and right sides of the figure. Here, when rotating the hook member 61, in order to deliver the container C to the hook member 61 on the left side of the figure as shown in FIG. 18(b), the rotary drive unit 60a of the container arrangement mechanism 60 on the right side of the figure is rotated so as to rotate the reversing gear 73a clockwise, and move the supported portion 64c of the support mechanism 64 that supports the container C such that the supported portion 64c is pushed out from the circular arc portions 61a. Accordingly, by forcibly releasing the magnets 61ab that hold the container C, the container C can be delivered to the hook member 61 on the left side of the figure.

Figure 22:
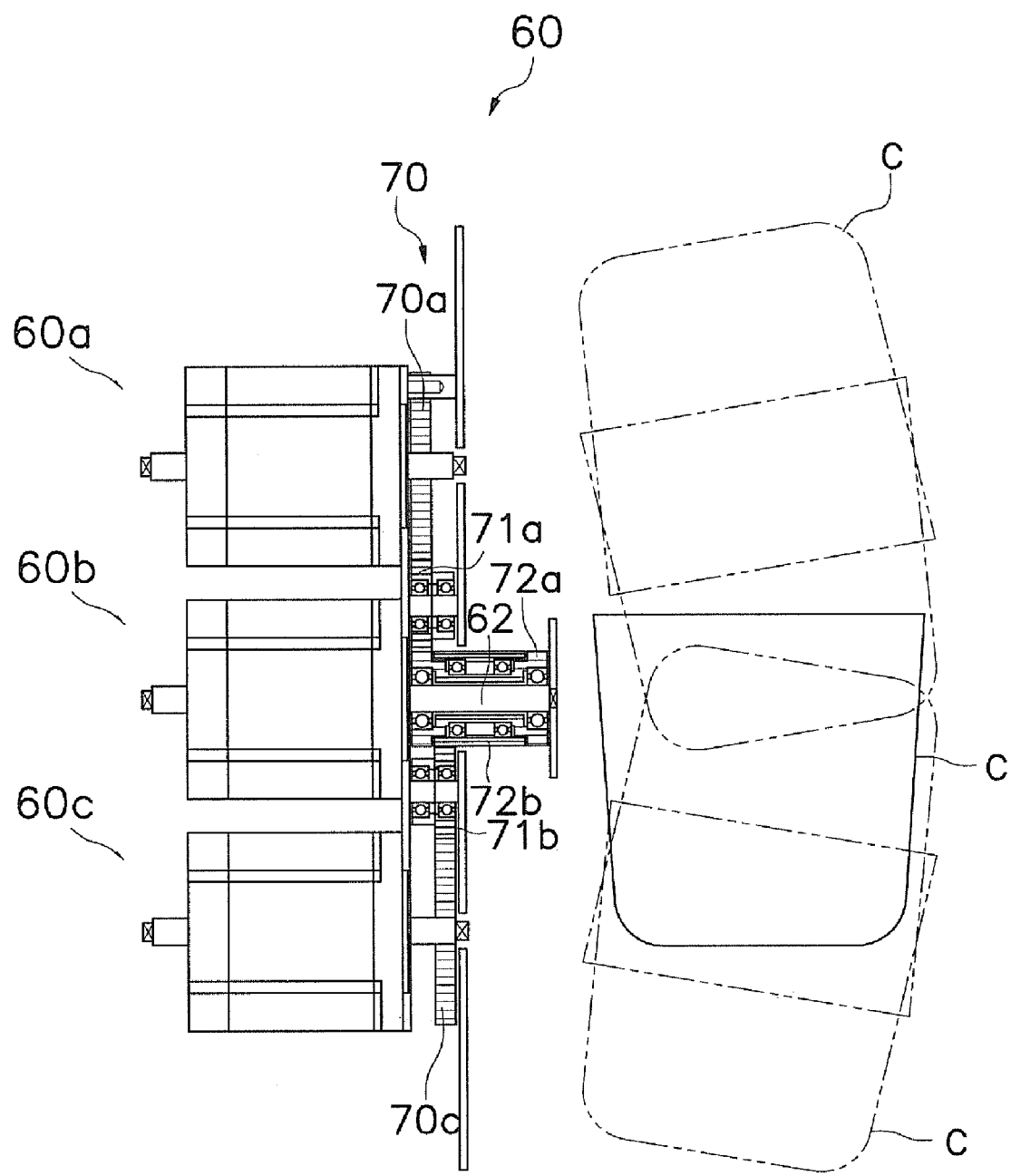
FIG. 22 is a lateral view illustrating a mechanism for vertically inverting the orientation of the container included in the container arrangement mechanism illustrated in FIGS. 14 and 16.

On the other hand, as for the hook member 61 that holds the containers C whose order needs to be changed at both ends thereof, as shown in FIG. 18(b) and FIG. 18(c), the container arrangement mechanism 60 is controlled such that the hook member 61 is rotated about 180 degrees counter-clockwise. Accordingly, as shown in FIG. 18(d), the order of the containers C is changed. At this time, in order to prevent the orientation of the container C from being vertically inverted while the hook member 61 is being rotated 180 degrees, the control unit 90 controls the rotary drive units 60a and 60c so as to prevent the opening side of the container C from being turned sideways or downward. More specifically, as shown in FIGS. 16 and 22, the reversing gear 73a is rotated via the gears 70a, 71a, and 72a included in the above described transmission mechanism 70, and thereby the orientation of the container C held by the hook member 61 on the left side of the figure is controlled. On the other hand, the reversing gear 73b is rotated via the gears 70c, 71b, and 72b included in the transmission mechanism 70, and thus the orientation of the container C held by the hook member 61 on the right side of the figure is controlled such that the opening of the container C is prevented from being turned sideways or downward.

Lastly, the control unit 90 controls the container arrangement mechanism 60 so as to return the adjacent hook member 61 that is stopped after being rotated 45 degrees counterclockwise to the original initial state as shown in FIG. 18(e), and thereby the operation in which the order of the containers C is changed is completed.

Note that as shown in FIG. 19(a), even when changing the order of two containers C that are held by the hook member 61 on the left side of the figure specifically at the circular arc portions 61a disposed at both ends of the hook member 61, the container arrangement mechanism 60 is controlled such that the adjacent hook member 61 on the right side of the figure is first rotated about 45 degrees counterclockwise as shown in FIG. 19(b), then the hook member 61 on the left side of the figure is rotated about 180 degrees as shown in FIGS. 19(b) through 19(d), and finally the hook member 61 on the right side of the figure is returned to the initial position as shown in FIG. 19(e). By so doing, a change in the order of the containers C can be smoothly completed, in the same way as described above.

Likewise, by changing the order of the containers C that are specified by the control unit 90 to discharge the articles therein in a certain order, it will be possible to discharge the articles in the desired discharge order when they enter the discharging zone Z3.

Operation in which Articles are Distributed to an Adjacent Container

Next, with reference to FIGS. 20(*a*) through 20(*d*), a description is given below of how the container arrangement mechanism 60 and the containers C in the combination weighing device 50 in this embodiment will be moved, when the containers C selected by the control unit 90 are tilted to distribute a portion or the entirety of the articles to their desired adjacent containers C.

In other words, based on the results of weighing in the supplying and weighing zone Z1, the control unit 90 selects containers C that store articles that are out of a predetermined weight range suitable to participate in combination weighing. Then, in the stocking and order changing zone Z2, the control 90 tilts the orientation of these containers C to distribute (discharge) a portion or the entirety of the articles to their adjacent containers C. Note that situations in which articles that are out of a predetermined weight range suitable to participate in combination weighing as described above may refer to, for example, a situation in which the amount of articles supplied in the supplying and weighing zone Z1 is too small, or conversely, when the amount thereof is too large.

Figure 20:
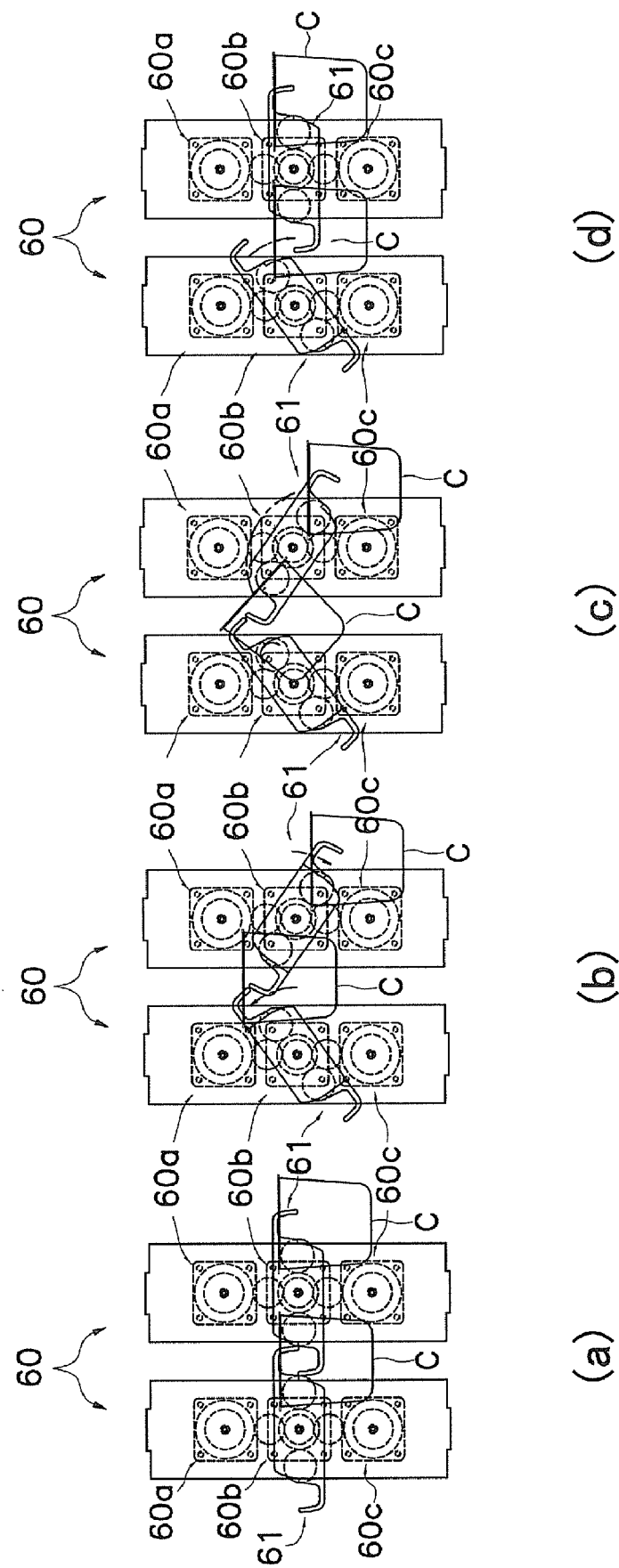
FIGS. 20(a) through 20(d) are elevation views illustrating the flow of an operation in which articles are distributed to an adjacent container by the container arrangement mechanism illustrated in FIGS. 14 and 16.
Figure 21:
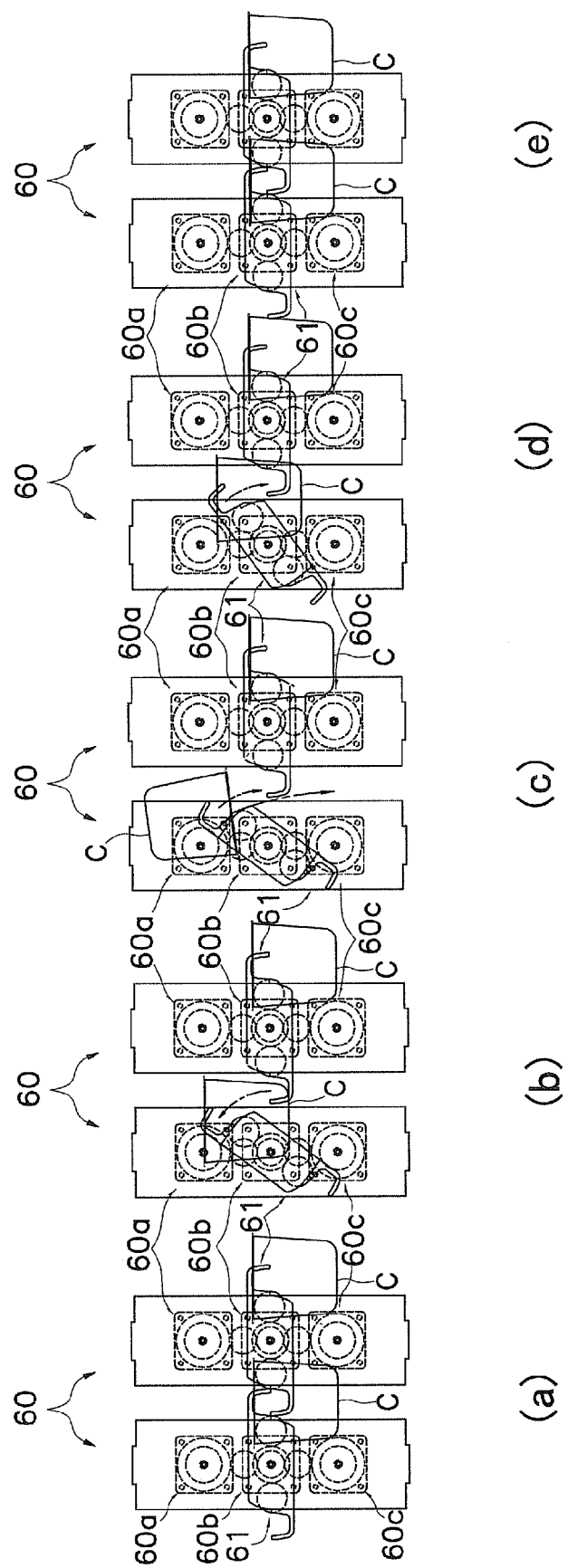
FIGS. 21(a) through 21(e) are elevation views illustrating the flow of an operation in which articles are discharged from the container by the container arrangement mechanism illustrated in FIGS. 14 and 16.

Specifically, as shown in FIG. 20(*a*), as for the two containers C that are held by the hook member 61 on the right side of the figure, more specifically at the circular arc portions 61*a* at both ends of the hook member 61, when the result of weighing shows that the weight of the articles stored in the container C on the left side of the figure is out of a predetermined weight range suitable to participate in combination weighing, the control unit 90 performs the following operations in order to distribute a portion or the like of the articles to its adjacent container C.

Figure 18:
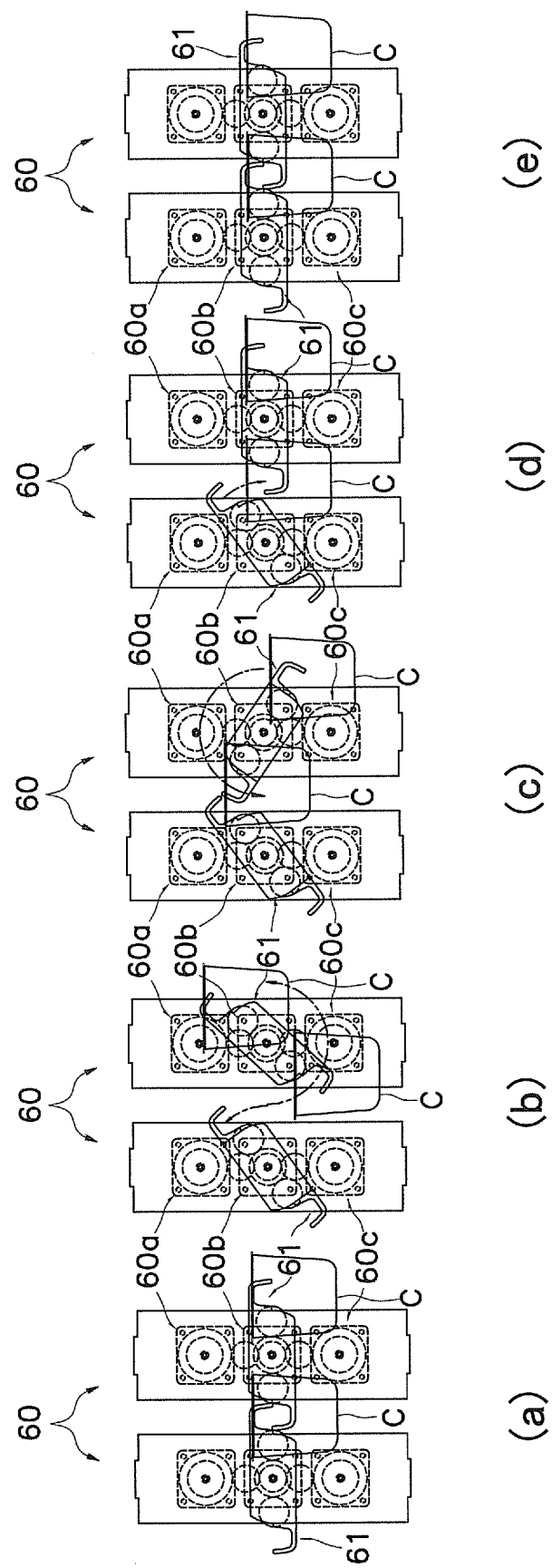
FIGS. 18(a) through 18(e) are elevation views illustrating the flow of an operation in which the order of the containers is changed by the container arrangement mechanism illustrated in FIGS. 14 and 16.
Figure 19:
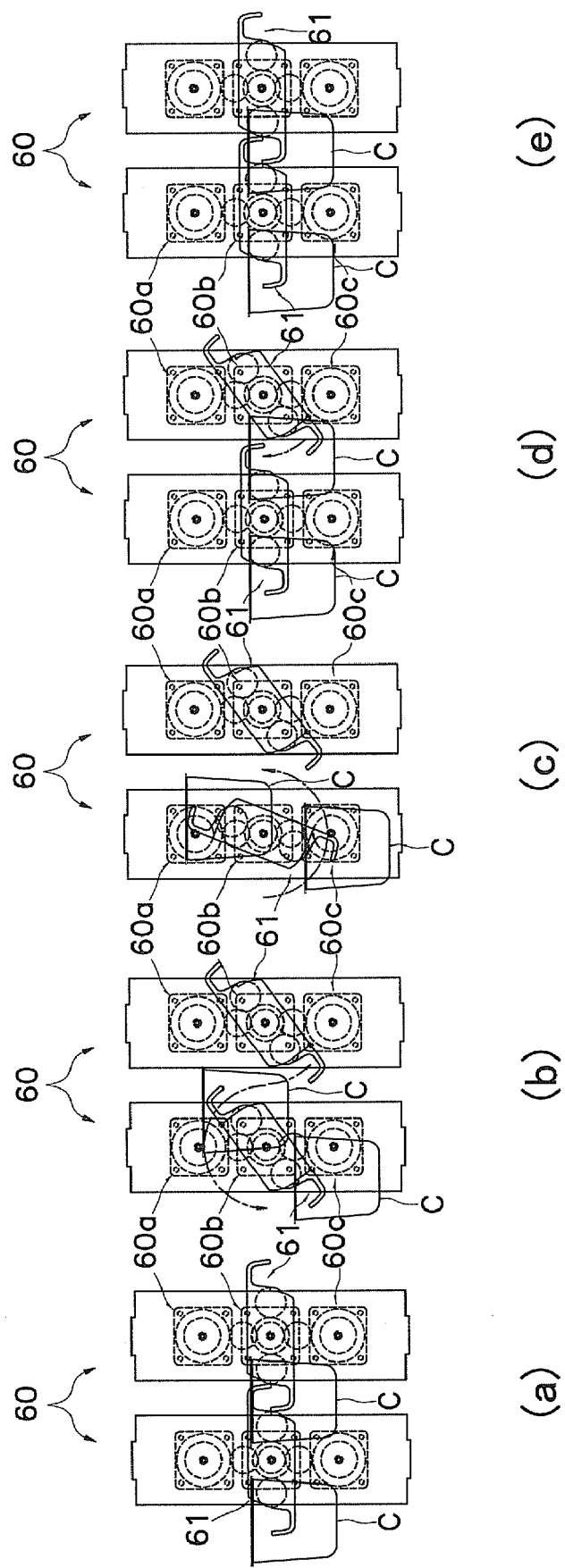
FIGS. 19(a) through 19(e) are elevation views illustrating the flow of an operation in which the order of the containers is changed by the container arrangement mechanism illustrated in FIGS. 14 and 16.

In other words, when it is recognized by the control unit 90 that the weight of the articles of the container C on the left side of the figure is out of a predetermined weight range, first, as shown in FIG. 20(*b*), the control unit 90 controls the container arrangement mechanism 60 such that the adjacent hook member 61 on the left side of the figure in an initial state at a position in a substantially horizontal direction is rotated about 45 degrees counterclockwise and stopped there, as shown in FIG. 18(*b*). Note that, as described above, the rotary drive of the hook member 61 is effected by the rotary drive unit 60*b* that drives the rotary shaft 22 that is the rotation center of the hook member 61.

At this time, as shown in FIG. 20(*a*), the container C that is held between the hook members 61 on the left and right sides of the figure is held by the magnet 61*ab* that is attached to the hook members 61 on the right side of the figure.

On the other hand, the control unit 90 controls the container arrangement mechanism 60 such that the adjacent hook member 61 on the right side of the figure holding the containers C at the circular arc portions 61*a* on both left and right sides is rotated about 45 degrees clockwise and stopped there, as shown in FIG. 20(*b*). Accordingly, the container C on the supply side from which the articles are distributed to its adjacent container C can be moved to a higher position, and also the container C into which the articles is distributed from its adjacent container C can be moved to a position lower than the position of the container C on the supply side. Note that, as described above, the rotary drive of the hook member 61 is performed by the rotary drive unit 60*b* that drives the rotary shaft 62 that is the rotation center of the hook member 61.

Next, as shown in FIG. 20(*b*), when the container C on the supply side is moved to a higher position and the container C on the receive side is moved to a lower position, the container arrangement mechanism 60 on the right side of the figure causes the rotary drive unit 60*a* to rotate the gear 70*a* clockwise. Subsequently, the reversing gear 73*a* rotates counterclockwise via the gears 71*a* and 72*a* shown in FIGS. 16 and 22, and thereby the container reversing gear 64*c* of the support mechanism 64 that engages with the reversing gear 73*a* will be rotated counterclockwise. As a result, as shown in FIG. 20(*c*), the container C that is supported by this support mechanism 64 can be tilted to the right side. Here, since the top of the container C is open, the articles can be discharged from the container C by tilting the container C. Consequently, the articles can be distributed from the container C to its adjacent container C that is disposed in a direction in which the opening faces when the container C is tilted.

Note that the tilt of the container C when its articles are discharged to its adjacent container C is controlled with the control unit 90 by the amount of rotation of the rotary drive unit 60*a* (rotary drive unit 60*c*) so as to reduce the tilt of the container C when discharging a small amount of the articles from the container C, and so as to increase the tilt of the container C when discharging a large amount (all) of the articles from the container C. Accordingly, it is possible to adjust the amount of the articles stored in the container C on the supply side such the weight of the articles will be in a predetermined weight range suitable to participate in combination weighing.

Then, as shown in FIG. 20(*d*), after the container C that was tilted for discharging is returned to the original state, the control unit 90 returns the hook member 61 on the right side to the initial position, after which the control unit 90 controls the container arrangement mechanism 60 so as to return the hook member 61 on the left side to the initial state.

After this, the container C on the supply side and the container C on the receive side again proceed to the supplying and weighing zone Z1, where they are weighed in a state in which the articles have been distributed, without being supplied with new articles.

Here, when the weights of the articles stored in the both containers C are in a predetermined weight range suitable to participate in combination weighing, these containers C will be moved to the stocking and order changing zone Z2 without any change. In this zone, the order of the containers C whose articles therein will participate in combination weighing is changed, and then the articles are subsequently discharged in the discharging zone Z3.

On the other hand, when the results of weighing the containers C after the articles are distributed show that the weight of either one or both of the containers C are out of the above described predetermined weight range, the control unit 90 again controls the container arrangement mechanism 60 and distributes the articles between the two containers C.

With the combination weighing device 50 in this embodiment, as described above, by performing an operation once or repeatedly in which the articles that are out of a predetermined weight range that is suitable to participate in combination weighing are distributed to another container C, the number of the containers C that are not suitable to participate in the combination weighing is reduced, and thereby it will be possible to efficiently perform combination weighing.

Note that the above-described operation in which the articles are distributed may be performed in a way that the containers C that store each of the articles selected by combination weighing are arranged to be adjacent to each other, and then the articles subsequently stored in these containers C are collected in a certain container C.

In such a case, the articles that will participate in combination weighing can be completely discharged by a single discharging operation, i.e., by vertically inverting one container C so that the discharging operation can be efficiently performed, compared to the case where the articles are discharged from a plurality of containers C.

Operation in which Articles are Discharged from the Container

Next, with reference to FIGS. 21(a) through 21(e), a description is given below of how the container arrangement mechanism 60 and the containers C in the combination weighing device 50 in this embodiment will be moved when the containers C selected by the control unit 90 are vertically inverted and the articles are discharged at a desired position.

In other words, based on the results of weighing in the supplying and weighing zone Z1, the control unit 90 changes the order of the containers C in the desired order in the stocking and order changing zone Z2, and then the articles are subsequently discharged from the containers C in the discharging zone Z3.

Specifically, as shown in FIG. 21(a), between the two containers C that are held by the hook member 61 on the right side of the figure, more specifically at the circular arc portions 61a disposed at both ends of the hook member 61, when the container C on the left side of the figure stores articles selected to participate in combination weighing, the control unit 90 discharges the articles from the container C on the left side of the figure in the discharging zone Z3.

In other words, first, as shown in FIG. 21(b), the container arrangement mechanism 60 is controlled such that the adjacent hook member 61 on the left side of the figure in an initial state in a substantially horizontal direction is rotated about 60 degrees counterclockwise and stopped there while the circular arc portion 61a on the right side of the figure keeps holding the container C. Note that, as described above, the rotary drive of the hook member 61 is performed by the rotary drive unit 60b that drives the rotary shaft 62 that is the rotation center of the hook member 61.

Note that at this time, as shown in FIG. 21(a), the container C that is held between the hook members 61 on the left and right sides of the figure is held by the magnets 61ab that are attached to the hook members 61 on the both left and right sides on the figure. Accordingly, as in the case described above, when rotating the hook member 61, in order to deliver the container C to the hook member 61 on the left side of the figure as shown in FIG. 21(b), the rotary drive unit 60a of the container arrangement mechanism 60 on the right side of the figure is rotated so as to rotate the reversing gear 73a clockwise and to move the supported portion 64c of the supports mechanism 64 that supports the container C such that the supported portion 64c is pushed out from the circular arc portions 61a. Accordingly, by forcibly releasing the magnets 61ab that hold the container C, the container C can be delivered to the hook member 61 on the left side of the figure.

Next, as shown in FIG. 21(b), when the container C on the supply side is moved to a position higher than the initial position, the container arrangement mechanism 60 on the left side of the figure causes the rotary drive unit 60c to rotate the gear 70c shown in FIGS. 16 and 22 clockwise.

Subsequently, the reversing gear 73b is rotated counterclockwise via the gears 71a and 72a, and thus it will be possible to rotate the container reversing gear 64d of the support mechanism 64 that engages with the reversing gear 73b clockwise. As a result, as shown in FIG. 21(c), the container C that is supported by this support mechanism 64 can be vertically inverted such that its opening faces downward. Accordingly, it is possible to discharge articles to a collection chute and the like (not shown) disposed below the containers C. In addition, at the time of discharging shown in FIG. 21(c), the control unit 90 controls the container arrangement mechanism 60 such that the container C is vertically inverted and the hook member 61 is rotated clockwise. Accordingly, a vertically downward force can be added to the articles that drop downward by the force of gravity when the container C rotates, so that tailing, which easily occurs when the articles comprise a plurality of article types, can be prevented from occurring.

Note that the vertical inversion of the container C at the time of discharging the articles to its adjacent container C is controlled with the control unit 90 by the amount of rotation of the rotary drive unit 60c (rotary drive unit 60a) such the container C rotates through a range from 150 degrees to 180 degrees. Accordingly, the articles stored in the container C can be reliably discharged to the outside.

Then, as shown in FIG. 21(d), after the container C that was tilted for discharging is returned to the original state, the control unit 90 controls the container arrangement mechanism 60 so as to return both of the hook members 61 on the left and right sides to the initial state as shown in FIG. 21(e).

With the combination weighing device 50 in this embodiment, as described above, the container C is vertically inverted at a timing in which a container C circularly moved in a substantially horizontal plane is moved to a predetermined position, and thus the articles stored in the container C can be discharged to a desired location. As described above, in this embodiment, based on the results of combination weighing, the order of the containers C is changed so that the articles therein can participate in combination weighing. Therefore, it is possible to continuously discharge desired articles to a predetermined location.

Characteristics of the Combination Weighing Device (1) The combination weighing device 50 in this embodiment comprises the rotor 51 that circularly moves a plurality of containers C containing articles therein in a substantially horizontal plane, the weighing unit 53 that weighs the articles dropped into the containers C, and the container arrangement mechanism 60 that changes the order of the containers C, in which, as shown in FIGS. 18(a) through 18(e), the container arrangement mechanism 60 moves two containers C selected by the control unit 90 (refer to FIG. 17) along a substantially vertical plane and changes the order of the two containers.

Accordingly, the order of the containers C can be changed in the desired order when weighing, stocking, and discharging the containers C while circularly moving them. Consequently, it is possible to continuously discharge the articles from the containers C when discharging the articles, by changing the order of the containers C during stocking. In addition, as shown in FIGS. 18(a) through 18(e), when changing the order of the containers C, the containers C are moved in a substantially vertical direction. Consequently, the horizontal space that is occupied by the device can be reduced, compared to the case where the order of the containers C is changed by moving in a substantially horizontal direction.

(2) With the combination weighing device 50 in this embodiment, as shown in FIGS. 20(*a*) through 22, the container arrangement mechanism 60 also functions as the rotating mechanism that vertically inverts the orientation of the containers C that are being circularly moved.

Accordingly, when combination weighing is performed by dropping articles into containers having open tops as with the container C, it is possible, by vertically inverting such containers C with the container arrangement mechanism 60, to supply a portion or the entirety of articles from these containers C to other containers C disposed nearby and to discharge the articles from the containers C at a predetermined discharge position.

(3) With the combination weighing device 50 in this embodiment, as shown in FIG. 11, the rotor 51 is rotated around the rotary shaft, and thus processes such as weighing, stocking, and discharging are performed while the plurality of containers C are being circularly moved.

Accordingly, the rotor 51 can be made to function not only as a conveying unit that conveys the plurality of containers C, but also as a stocking unit for the containers C until they are selected by the control unit 90 through combination weighing.

(4) With the combination weighing device 50 in this embodiment, a circulation loop that is formed by circularly moving the plurality of containers C is formed in a substantially horizontal plane.

Accordingly, the space occupied by the device in the vertical direction can be minimized, thus reducing the size of the device.

(5) With the combination weighing device 50 in this embodiment, as shown in FIG. 11 and the like, the rotor 51 that functions as the conveying unit is provided with the weighing unit 53 that is fixedly disposed thereon in order to weigh the articles dropped into the containers C.

Accordingly, the weighing unit 53 can perform weighing while the plurality of containers C are circularly moved, and thus the process from weighing to discharging can be speeded up.

(6) With the combination weighing device 50 in this embodiment, the control unit 90 shown in FIG. 17 performs a combination calculation based on the results of weighing by the weighing unit 53.

Accordingly, based on the results of the combination calculation by the control unit 90, the container arrangement mechanism 60 changes the order of the containers C, and thus the articles that will participate in combination weighing can be continuously discharged. As a result, the time in which all the articles that will participate in combination weighing are discharged can be reduced, and thereby the discharging process of the articles can be efficiently performed.

Figure 12:
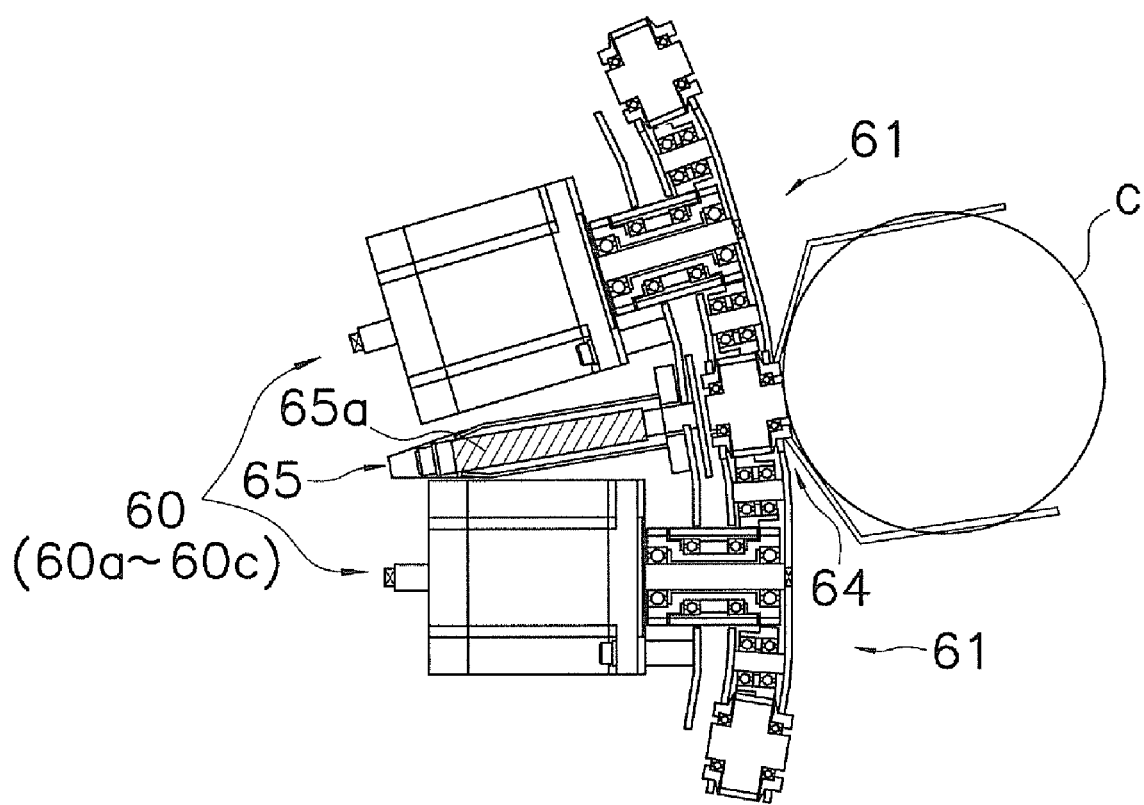
FIG. 12 is a plan view illustrating the positional relationship between a weigher and a container arrangement mechanism included in the combination weighing device of FIG. 11.

(7) With the combination weighing device 50 in this embodiment, as shown in FIGS. 11 and 12, each weigher 65 that weighs the articles stored in a plurality of containers C is disposed between the container arrangement mechanisms 60.

In this way, by providing the weigher 65 separately from the container arrangement mechanism 60 that includes the drive system, it is possible to prevent weighing from being adversely affected by vibration and the like that occur when the hook member 61 is driven, and thus highly accurate weighing can be performed all the time.

(8) With the combination weighing device 50 in this embodiment, the container arrangement mechanism 60 changes the order of the containers C together with the support mechanisms 64 that support the containers C.

Accordingly, even when changing the order of the containers C with open tops by moving them in a substantially vertical plane, the order of the containers C can be easily changed with the containers C being held.

Other Embodiments

While selected embodiments of the present invention have been described thus far, the scope of the invention is not limited to the above-described embodiments, and various changes and modifications can be made herein without departing from the scope of the invention.

(A) In the above embodiments, an example was described in which the conveying device according to the present invention is applied to the combination weighing device 10. However, the present invention is not limited thereto.

Figure 8:
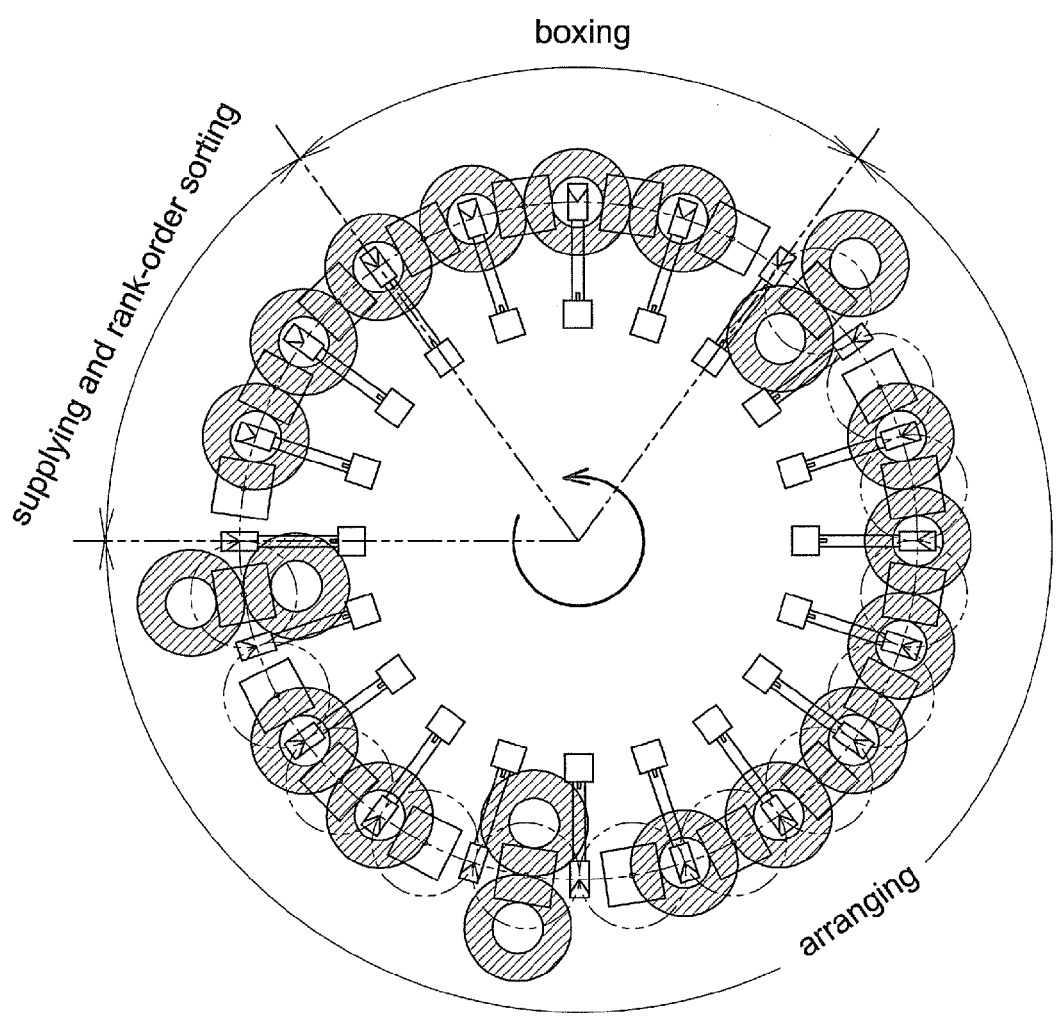
FIG. 8 is a plan view illustrating the configuration of a quality inspection device according to another embodiment of the present invention.
Figure 9:
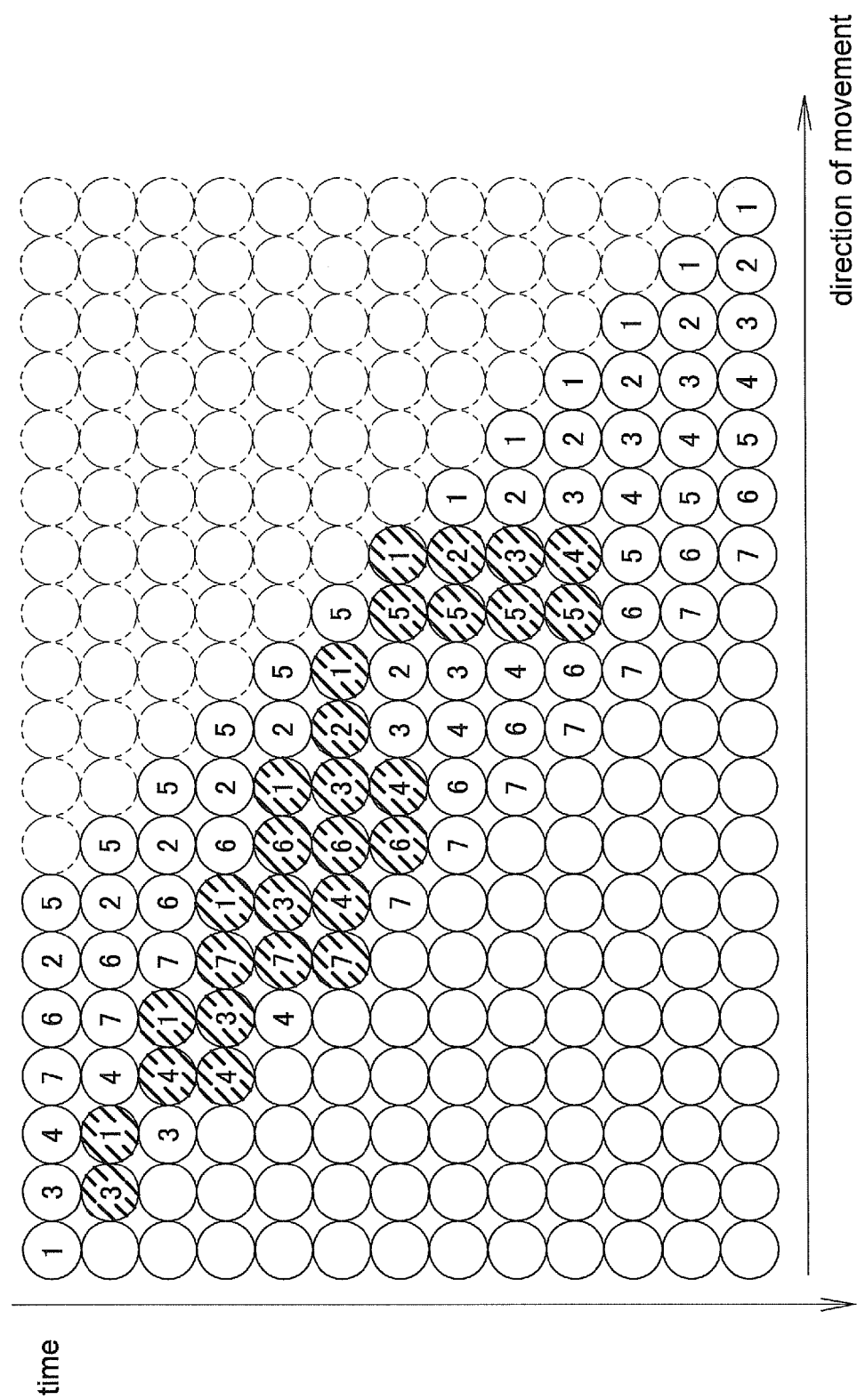
FIG. 9 is a view illustrating a process in which the order of the containers C is changed in the quality inspection device of FIG. 8.

For example, as shown in FIG. 8, the conveying device may be mounted as a conveying device in a quality inspection device such as a rank-order sorting device and a seal checker. In such a case, for example, as shown in FIG. 9, articles ranked into seven groups by the rank-order sorting device may be arranged such that the articles are disposed in the rank order. The example shown in FIG. 9 indicates that the containers C shaded with diagonal lines have been arranged in that order. Accordingly, the articles can be discharged from the containers C that are arranged in the rank order before the containers C are conveyed to the discharge position, so that the post-processes such as boxing and the like can be efficiently performed.

In addition, with an inspection device such as a seal checker that sorts out defective products and non-defective products, the order of the containers C may be changed such that the defective products and the non-defective products are completely divided in two. In addition, in such a case, containers C with articles therein can be arranged in a desired order during conveyance, so that post-processes such as boxing and the like can be efficiently performed.

(B) In the above embodiment, a configuration in which the order of the containers C is changed while the containers C are being rotatably moved was described as an example. However, the present invention is not limited thereto.

Figure 10:
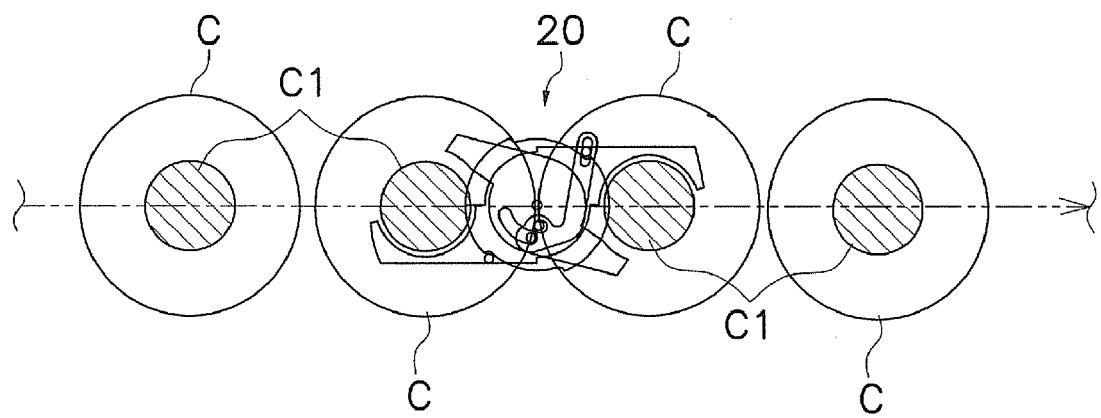
FIGS. 10(a) and 10(b) are respectively a plan view and an elevation view illustrating the configuration of a conveying device according to another embodiment of the present invention.
Figure 10:
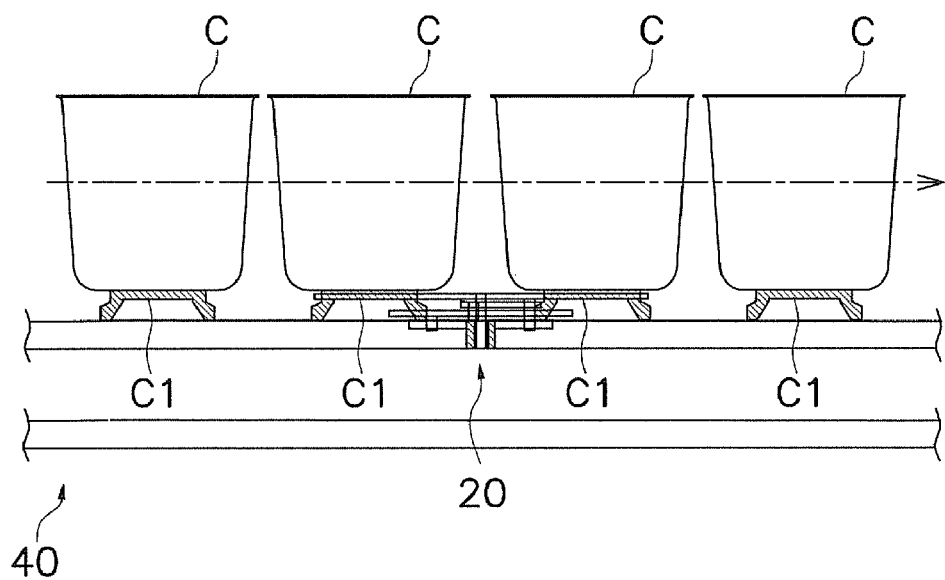

For example, as shown in FIG. 10, the configuration may be one in which the order of the containers C is changed by the container arrangement mechanism 20 having a similar configuration as in the above embodiment, while the containers C are being conveyed by a conveying unit 40 that linearly conveys the containers C.

(C) In the above embodiment, an example was described in which the order of two containers that are adjacent to each other is changed by the container arrangement mechanism 20. However, the present invention is not limited thereto.

For example, the configuration may be one in which the order of two containers that are disposed so as to sandwich one container is changed. However, in this case, the control for the arrangement of a plurality of containers in the desired order will become complicated. Therefore, in view of simplifying the control, it is more preferable that the present invention employs a configuration in which the order of two adjacent containers is changed as in the above embodiment.

(D) In the above embodiment, an example was described in which the order of two containers C that are adjacent to each other is changed by the container arrangement mechanism 20. However, the present invention is not limited thereto.

For example, a container arrangement mechanism that changes the order of four adjacent containers may be used. However, in this case as well, the control for the arrangement of a plurality of containers in the desired order will become complicated. Therefore, in view of simplifying the control, it is more preferable that the present invention employs a mechanism in which the order of two containers is changed as in the above embodiment.

(E) In the above embodiment, an example was described in which the container arrangement mechanism 20 that changes the order of the containers C during conveyance moves together with the rotary table 11 (container C) along the rotation path of the containers C. However, the present invention is not limited thereto.

For example, when the containers are moved intermittently, the container arrangement mechanism may be fixedly disposed at a predetermined position on the side of the conveying path of the containers. In this case, the order changing mechanism may change the order of the containers by coming into contact with and holding the containers that are being intermittently moved before the containers enters the stopped state.

(F) In the above embodiment, an example was described in which weighing, stocking, and discharging articles dropped into the containers C are performed. However, the present invention is not limited thereto.

For example, the present invention may employ a configuration in which the order of articles is directly changed without involving the containers C. In this case as well, post-processes can be efficiently performed in the same way as described above.

(G) In the above embodiment, an example was described in which, as shown in FIG. 11, one circulation loop is formed in a substantially horizontal plane by circularly moving the plurality of container arrangement mechanisms 60 and weighers 65 in a substantially horizontal plane. However, the present invention is not limited thereto.

Figure 23:
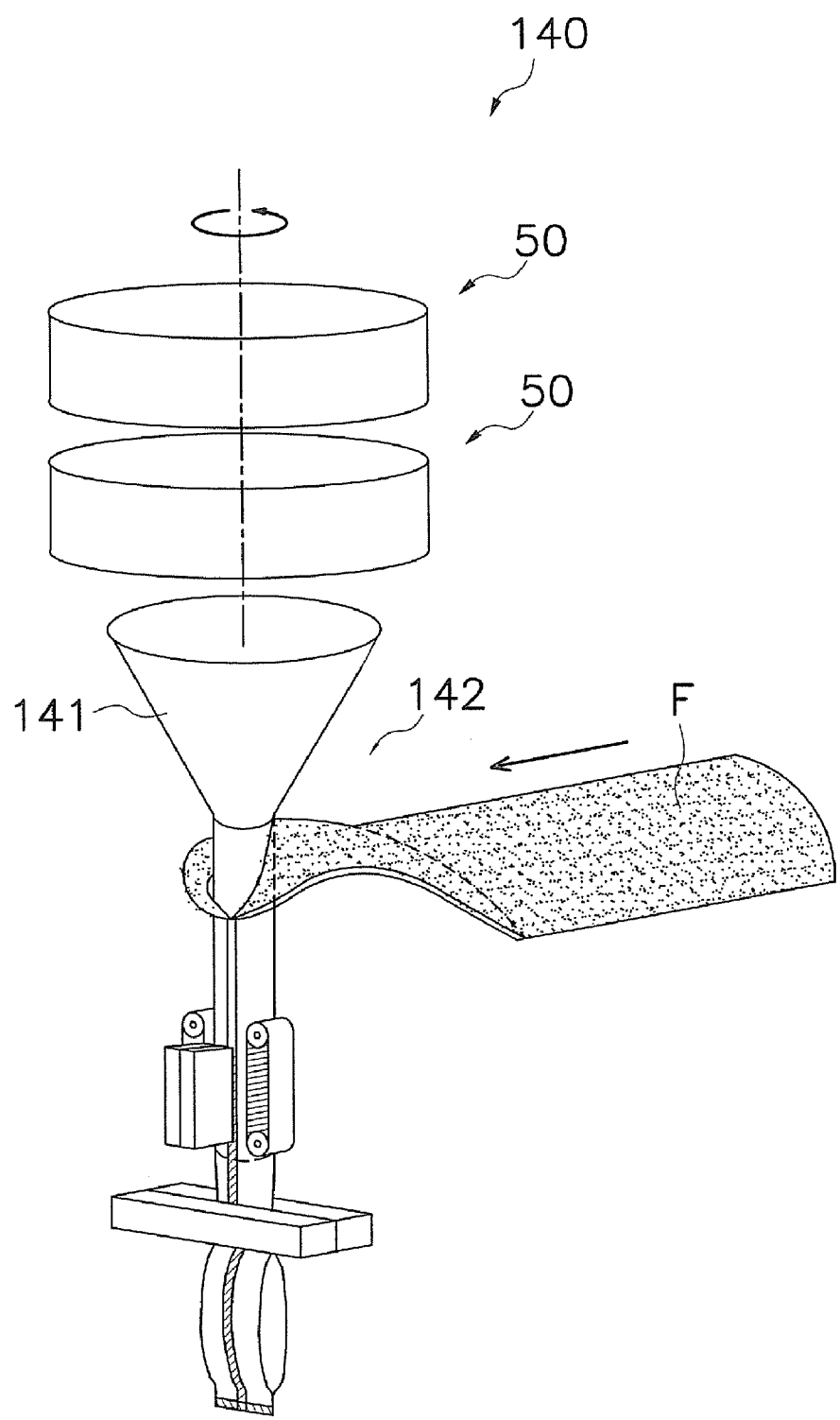
FIG. 23 is a perspective view illustrating the configuration of a bag packaging system included in a combination weighing device being equipped with a conveying device according to another embodiment of the present invention.

For example, as in the bag packaging system 140 shown in FIG. 23 in which a collection chute 141 that collects discharged articles and a bag packaging machine 142 that makes bags using film F are provided on the downstream side, the present invention may be configured by a plurality of combination weighing devices 50 that are disposed such that circulation loops in which the containers C are moved along a substantially horizontal plane as shown in FIG. 11 are vertically superposed for plural stages.

In this case, the containers C that are being circularly moved along the circulation loop located on the upper stage are vertically inverted above the containers C that are being circularly moved along the circulation loop located on the lower stage, and thereby the articles are supplied and distributed from the containers C on the upper stage to the containers C on the lower stage.

(H) In the above embodiment, with reference to FIGS. 20(*a*) through 20(*d*), how the articles are distributed was described with an example in which the weights of both the two containers C on the supply side and the receive side, which are selected by the control unit 90, are out of the above-described predetermined weight range. However, the present invention is not limited thereto.

For example, it may be that the weight of the articles stored in one of either containers C is out of the above-described predetermined weight range, and the weight of the articles stored in the other container C is in the above-described predetermined weight range.

For example, when the weight of the articles in the container C on the supply side is out of the above-described predetermined weight range, the degree of tilt of the container C is controlled, in view of the weight of the articles stored in the container C on the receive side, such that the amount of articles to be supplied is prevented from exceeding the above described predetermined weight range.

Accordingly, even when combination weighing is performed with the articles in the above described predetermined weight range and the articles out of the above described predetermined weight range, both the articles can be made to be in the predetermined weight range.

(I) In the above embodiment, an example was described in which the containers C are delivered and received via the support mechanism 64, instead of directly delivering and receiving the containers C between the container arrangement mechanisms 60. However, the present invention is not limited thereto.

For example, the containers may be directly delivered and received between the container arrangement mechanisms without involving the support mechanism. Also in this case, a similar effect as described above can be attained, i.e., a process in which the articles are efficiently discharged by the combination weighing device.

(J) In the above embodiment, an example was described in which the conveying device according to the present invention is applied to the combination weighing device 50. However, the present invention is not limited thereto.

For example, the conveying device according to the present invention may be mounted as a conveying device in a quality inspection device such as a rank-order sorting device and a seal checker. In this case, for example, articles ranked into seven groups by the rank-order sorting device may be arranged in an order such that the articles are disposed in the rank order.

Accordingly, the articles can be discharged from the containers C that are arranged in the rank order before the containers C are conveyed to the discharge position, so that the post-processes such as boxing and the like can be efficiently performed.

In addition, with an inspection device such as a seal checker that sorts out defective products and non-defective products, the order of the containers C may be changed such that the defective products and the non-defective products are completely divided in two. Also in such a case, the containers C can be arranged in the desired order during conveyance, so that post-processes such as boxing and the like can be efficiently performed.

(K) In the above embodiment, the configuration in which the order of the containers C is changed while the containers C are being circularly moved was described as an example. However, the present invention is not limited thereto.

For example, the configuration may be one in which the order of the containers C is changed by a container arrangement mechanism having a similar configuration as the one in the above embodiment, while the containers C are being conveyed by a conveying unit that linearly conveys the containers C.

(L) In the above embodiment, an example was described in which the order of two mutually adjacent containers is changed by the container arrangement mechanism 60. However, the present invention is not limited thereto.

For example, the configuration may be one in which the order of two containers that are disposed so as to sandwich one container is changed. However, in this case, the control for the arrangement of a plurality of containers in the desired order will become complicated. Therefore, in view of simplifying the control, it is more preferable that the present invention employs a configuration in which the order of two adjacent containers is changed as in the above embodiment.

(M) In the above embodiment, an example was described in which the order of two adjacent containers is changed by the container arrangement mechanism 60. However, the present invention is not limited thereto.

For example, a container arrangement mechanism that changes the order of four adjacent containers may be used. However, in this case as well, the control for the arrangement of a plurality of containers in the desired order will become more complicated. Therefore, in view of simplifying the control, it is more preferable that the present invention employs a mechanism that changes the order of two containers as in the above embodiment.

(N) In the above embodiment, an example was described in which the container arrangement mechanism 60 that changes the order of the containers C during conveyance moves together with the rotary rotor 51 (container C) along the rotation path of the containers C. However, the present invention is not limited thereto.

For example, when the containers are being intermittently moved, the container arrangement mechanism may be fixedly disposed at a predetermined position on a side of the conveying path of the containers. In this case, the order changing mechanism may change the order of the containers by coming in contact with and holding the containers that are being intermittently moved before the containers enter the stopped state.

With the conveying device of the present invention, the order of the containers being conveyed is changed so as to arrange the containers in the desired order, and thus it is possible to speeding up post-processes such as discharging the articles in the combination weighing device and rank-order sorting in the quality inspection device. Consequently, the present invention is widely applicable to various devices equipped with a conveying device that conveys a plurality of articles.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A conveying device comprising:
   a conveying unit configured to convey a plurality of containers along a conveying path;
   an order changing mechanism configured to change the order of a plurality of containers selected from amongst the plurality of containers while the plurality of containers are conveyed by the conveying unit along the conveying path; and
   a control unit configured to specify which containers among the plurality of containers are to be arranged in order by the order changing mechanism.

2. The conveying device according to claim 1, wherein the order changing mechanism changes the order of two adjacent containers selected from amongst the plurality of containers.

3. The A conveying device comprising:
   a conveying unit configured to convey a plurality of containers;
   an order changing mechanism configured to change the order of a plurality of containers selected from amongst the plurality of containers conveyed by the conveying unit; and
   a control unit configured to specify which containers among the plurality of containers are to be arranged in order by the order changing mechanism,
   the order changing mechanism including
   a pair of holding portions configured to hold containers to be arranged in order,
   a rotary shaft disposed midway between the holding portions, and
   a drive unit configured to rotate the pair of holding portions around the rotary shaft.

4. The conveying device according to claim 1, wherein the order changing mechanism is disposed along the conveying path in which the containers are conveyed by the conveying unit.

5. The conveying device according to claim 1, wherein the order changing mechanism is configured to change the order of the containers by rotatably moving the containers in a substantially horizontal plane.

6. The conveying device according to claim 1, wherein the order changing mechanism is one of a plurality of order changing mechanisms that are disposed along the conveying path in which the containers are conveyed by the conveying unit.

7. A combination weighing device comprising:
   the conveying device according to claim 1;
   a weighing unit configured to weigh articles dropped into the containers; and
   a discharge unit configured to discharge articles from a plurality of containers that are arranged in a desired order by the conveying device.

8. A quality inspection device comprising:
   the conveying device according to claim 1; and
   an inspection unit configured to inspect the quality of articles dropped into the containers.

9. The conveying device according to claim 1, wherein the order changing mechanism is configured to change, in a substantially perpendicular plane, the order of a plurality of containers selected from amongst the plurality of containers that are being conveyed by the conveying unit.

10. A conveying device comprising:
a conveying unit configured to convey a plurality of containers;
an order changing mechanism configured to change the order of a plurality of containers selected from amongst the plurality of containers conveyed by the conveying unit; and
a control unit configured to specify which containers among the plurality of containers are to be arranged in order by the order changing mechanism,
the order changing mechanism being configured to change, in a substantially perpendicular plane, the order of a plurality of containers selected from amongst the plurality of containers that are being conveyed by the conveying unit,
the order changing mechanism including a rotating mechanism configured to rotate the orientation of the containers.

11. The conveying device according to claim 9, wherein the conveying unit is configured to move the plurality of containers along a cyclical path.

12. The conveying device according to claim 11, wherein the cyclical path of the containers formed by the conveying unit is in a substantially horizontal plane.

13. The conveying device according to claim 9, further comprising
a weighing unit configured to weigh the containers.

14. The conveying device according to claim 13, further comprising
a combination calculation unit configured to perform combination calculation using results of weighing performed by the weighing unit.

15. The conveying device according to claim 13, wherein
the order changing mechanism is one of a plurality of order changing mechanisms, and the weighing unit is disposed between the plurality of order changing mechanisms.

16. The conveying device according to claim 9, wherein
the order changing mechanism comprises support members that support the containers, and the order changing mechanism is configured to change the order of the containers together with the support members.

17. A combination weighing device comprising the conveying device according to claim 9.

18. A quality inspection device comprising:
the conveying device according to claim 9; and
an inspection unit configured to inspect the quality of articles dropped into the containers.

19. A conveying device comprising:
a conveying unit configured to convey a plurality of containers;
an order changing mechanism configured to rearrange the order of the plurality of containers conveyed by the conveying unit by switching positions of a plurality of containers selected from amongst the plurality of containers conveyed by the conveying unit; and
a control unit configured to specify which containers among the plurality of containers are to be arranged in order by the order changing mechanism.

* * * * *